(12) United States Patent
Nakamura et al.

(10) Patent No.: US 9,097,042 B2
(45) Date of Patent: Aug. 4, 2015

(54) FRONT BODY STRUCTURE FOR VEHICLE

(75) Inventors: Jun Nakamura, Utsunomiya (JP);
Naoki Shishida, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 777 days.

(21) Appl. No.: 13/403,269

(22) Filed: Feb. 23, 2012

(65) Prior Publication Data

US 2012/0217761 A1 Aug. 30, 2012

(30) Foreign Application Priority Data

Feb. 25, 2011 (JP) ................................. 2011-040198

(51) Int. Cl.
| | |
|---|---|
| *B62D 25/12* | (2006.01) |
| *E05B 83/24* | (2014.01) |
| *B62D 25/10* | (2006.01) |
| *E05B 77/02* | (2014.01) |
| *E05B 77/10* | (2014.01) |
| *B60R 21/34* | (2011.01) |

(52) U.S. Cl.
CPC .............. *E05B 83/24* (2013.01); *B60R 21/34* (2013.01); *B62D 25/105* (2013.01); *E05B 77/02* (2013.01); *E05B 77/10* (2013.01); *B60R 2021/343* (2013.01); *Y10T 292/0946* (2015.04)

(58) Field of Classification Search
CPC ... E05B 83/24; E05B 77/10; Y10T 292/0946; B60R 21/34; B60R 2021/343
USPC ............. 296/187.09, 193.11, 187.03, 187.04; 292/97

IPC .................................. B62D 25/10; G62D 25/12
See application file for complete search history.

(56) References Cited

U.S. PATENT DOCUMENTS

| | | | | |
|---|---|---|---|---|
| 7,416,241 | B2 * | 8/2008 | Wallman et al. | 296/187.03 |
| 7,497,508 | B2 * | 3/2009 | Wallman et al. | 296/193.11 |
| 7,537,272 | B2 * | 5/2009 | Hirata et al. | 296/187.04 |
| 7,984,943 | B2 * | 7/2011 | Iwano et al. | 296/193.11 |
| 8,016,347 | B2 * | 9/2011 | Uchino | 296/193.11 |
| 8,075,048 | B2 * | 12/2011 | Kimoto et al. | 296/193.11 |
| 8,118,352 | B2 * | 2/2012 | Rocheblave et al. | 296/193.11 |
| 8,403,405 | B2 * | 3/2013 | Ikeda et al. | 296/193.11 |
| 2013/0181484 | A1 * | 7/2013 | Grattan | 296/193.11 |

FOREIGN PATENT DOCUMENTS

| | | |
|---|---|---|
| JP | 2004-100267 A | 4/2004 |
| JP | 2010-163767 | 7/2010 |
| JP | 2010-208556 A | 9/2010 |

OTHER PUBLICATIONS

JPO Communication in related Honda Motor Co., Ltd. JP Application No. 2011-040198, Office Action mailed Sep. 9, 2014, pp. 4 (JP).
Translated abstract of JP2010-163767 from http://www4.ipdl.inpit.go.jp/; accessed on Feb. 22, 2012.

* cited by examiner

*Primary Examiner* — Pinel Romain
(74) *Attorney, Agent, or Firm* — William R. Fisher

(57) ABSTRACT

A front body structure for a vehicle includes a striker bracket provided in a hood frame, and a frame reinforcing unit provided in front of the striker bracket to reinforce the hood frame. In addition to, or alternatively, a reinforcement is arranged between the frame and a at least a portion of the hood skin.

20 Claims, 15 Drawing Sheets

FRONT BODY STRUCTURE FOR VEHICLE

CROSS REFERENCE TO RELATED APPLICATIONS

The present application claims priority under 35 U.S.C. §119 to Japanese Patent Application No. 2011-040198, filed Feb. 25, 2011, entitled "Front Body Structure For Vehicle," the contents of which are incorporated herein by reference in their entirety.

TECHNICAL FIELD

The present disclosure relates to a front body structure for a vehicle in which a hood locking device is provided on a [front] side of the vehicle, in which a striker able to be engaged by the hood locking device is provided in a hood, and in which the hood locking device is engaged by the striker so as to be able to hold the hood in a closed position.

BACKGROUND

In the front body structure of a vehicle, a front bulkhead is provided in the front portion of an engine compartment, a hood locking device is provided in the upper portion of the front bulkhead, and a hood is provided above the hood locking device. An unlocking lever in the hood locking device can be operated to separate a locking hook from the striker on the hood. The hood can be released by separating the locking hook from the striker.

However, when an impact load is inputted to the hood from above at the front of the vehicle, the unlocking lever inside the hood locking device is known to be configured so that it is advantageously deformed and absorbs the impact load.

SUMMARY

Some of these vehicles are relatively heavy such as recreational vehicles (RV). A relatively large impact load is believed to be inputted to the front body structure of relatively heavy vehicles. As a countermeasure, a large distance has to be ensured from the front bulkhead to the front bumper beam, and the amount of deformation of the vehicle body has to be increased in response to an inputted impact load.

However, when a large distance from the front bulkhead to the front bumper beam is ensured, the unlocking lever in the hood unlocking device has to be extended further towards the front of the vehicle, and the overall length of the unlocking lever is greater. When the overall length of the unlocking lever is greater and the unlocking lever is operated at the unlocked position, the vertical stroke of the unlocking lever is increased.

Therefore, the hood has to be shaped so that the operation of the unlocking lever does not interfere with the hood when the unlocking lever is operated in the unlocked position. The hood also has to be shaped so that the hood is advantageously deformed and absorbs an impact load when an impact load is inputted to the hood from above at the front of the vehicle.

The present disclosure provides a front body structure for a vehicle that is able to advantageously absorb an impact load inputted from above at the front of the vehicle and that is able to ensure the operation of the unlocking lever.

In accordance with one embodiment, a front body structure is provided for a vehicle having an openable and closable hood including a hood skin forming an exterior surface of the front body structure and a hood frame provided on an interior surface of the hood skin, a bulkhead provided below the hood, a hood locking device provided in the bulkhead, and a striker bracket provided on the hood frame. A striker extends from the striker bracket for engaging the hood locking device. A frame reinforcing unit is provided in front of the striker bracket for reinforcing the hood frame, and a reinforcement is secured to the hood frame and at least partially positioned between the frame reinforcing unit and the hood skin.

In accordance with one embodiment, the hood locking device has a lock unit provided in the bulkhead, and an unlocking lever able to unlock the lock unit and the striker in a locked state by extending the unlocking lever from the lock unit towards the frame reinforcing unit. The frame reinforcing unit bulges from the hood frame towards the hood skin and comprises a top unit that is inclined towards the front of the vehicle and is arranged above the unlocking lever when the striker is in a locked state. A low strength portion is provided on the top unit and having less strength than the top unit surrounding the low strength portion. A base is provided around the top unit for reinforcing the top unit.

In accordance with one embodiment, the low strength portion defines an opening in the top unit.

In accordance with one embodiment, the base includes a front vehicle portion positioned in front of the low strength portion relative to the vehicle and a rear vehicle portion positioned to the rear of the low strength portion relative to the vehicle, and the front vehicle portion and the rear vehicle portion are each substantially formed in a bowl shape, and the strength of the rear vehicle portion is greater than the strength of the front vehicle portion.

In accordance with one embodiment, a front tier unit is formed in the front vehicle portion and a rear tier unit is formed in the rear vehicle portion, and the number of tiers in the rear tier unit is greater than the number of tiers in the front tier unit.

In accordance with one embodiment, the hood frame has a substantially C-shaped peripheral edge unit bulging away from the hood skin on the periphery of the frame reinforcing unit in portions other than the front side of the vehicle.

In accordance with one embodiment, the reinforcement has a reinforcement main body provided on a downward slope along the hood skin towards the front of the vehicle, a pair of front leg units extending from the reinforcement main body, and a pair of rear leg units extending from the reinforcement main body on a downward slope towards the rear of the vehicle, and a mounting unit for each front leg unit and a mounting unit for each rear leg unit is positioned on the hood frame to substantially surround the striker bracket.

In accordance with one embodiment, the reinforcement main body is equipped with at least one reinforcing bead extending in the length direction of the vehicle.

In accordance with one embodiment, each front leg unit is at least partially indented towards the reinforcement main body to form a front leg reinforcing unit, the front leg reinforcing unit extending in a substantially perpendicular direction to the reinforcement main body.

In accordance with one embodiment, each rear leg unit narrows in shape as it extends from the reinforcement main body towards the hood frame.

In accordance with one embodiment, each rear leg unit has a rear leg main body assuming a narrower shape as it extends from the reinforcement main body towards the hood frame, an inner flange for reinforcement extending out from an inner portion of an inner edge of the rear leg main body except in the vicinity of the mounting unit, and an outer flange for reinforcement extending out from the outer portion of the outer edge of the rear leg main body except in the vicinity of the reinforcement main body.

In accordance with one embodiment, the mounting unit of each rear leg and the striker are aligned substantially parallel to the width direction of the vehicle.

In accordance with one embodiment, in the hood frame, a front leg support unit provided for engagement with a mounting unit for a front leg unit bulges toward the hood skin, and a rear leg support unit provided for engagement with a mounting unit for a rear leg unit bulges toward the hood skin.

In accordance with one embodiment, a frame reinforcing unit for reinforcing the hood frame is provided in front of the striker bracket relative to the vehicle. A reinforcement is arranged between the frame reinforcing unit and the hood skin. In other words, a frame reinforcing unit and a reinforcement are provided in the portion of the striker bracket on the front side of the vehicle.

The portion of the striker bracket on the front side of the vehicle is the portion acted upon by an impact load inputted from above at the front of the vehicle. Because the strength of the frame reinforcing unit and the strength of the reinforcement can be adjusted individually, the impact load can be absorbed advantageously, and the strength of the load input unit can be adjusted advantageously.

Without being limited to any particular theory, it is believed that the striker contacts the hood locking device and a load is inputted to the striker when the hood is closed. Therefore, a frame reinforcing unit for reinforcing the hood frame is provided in the hood frame in front of the striker bracket with respect to the vehicle. In addition to, or alternatively, one or more mounting units for the reinforcement may be positioned on the hood frame around the striker bracket. The area surrounding the striker bracket in the hood frame can thus be reinforced by the frame reinforcing unit and optionally the mounting units. When the hood is closed, the striker contacts the hood locking device, and the load inputted to the striker can be favorably dispersed to the reinforcing unit and any mounting units surrounding the striker bracket.

In accordance with one embodiment, the top unit of the frame reinforcing unit is inclined towards the front of the vehicle. By inclining the top unit towards the front of the vehicle, the impact load inputted from above at the front of the vehicle can be favorably received by the top unit. A low strength portion may be provided in the top unit. By providing a low strength portion in the top unit, the top unit can be favorably deformed by the impact load inputted from above at the front of the vehicle. Thus, the impact load inputted from above at the front of the vehicle can be advantageously absorbed by the frame reinforcing unit.

A top reinforcing unit may be provided in the frame reinforcing unit. By providing a top reinforcing unit in the frame reinforcing unit, the strength of the frame reinforcing unit can be increased. When the hood is closed, the striker contacts the hood locking device, and the load inputted to the striker can be favorably dispersed to the frame reinforcing unit.

In addition, a frame reinforcing unit is arranged above the unlocking lever, and bulges upward towards the hood skin. Thus, the frame reinforcing unit can be sufficiently separated upward from the unlocking lever. When the unlocking lever is operated, the vertical range of movement can be ensured, and the unlocking lever can be operated favorably.

The distance from the front bulkhead to the front bumper beam is great in a vehicle such as an RV in order to ensure the absorption of impact loads. A hood unlocking device provided in this vehicle has to have an unlocking lever that extends further towards the front of the vehicle, and the overall length of the unlocking lever has to be greater. When the overall length of the unlocking lever is greater, the vertical stroke (amount of movement) of the unlocking lever is greater.

Thus, in accordance with one embodiment, the frame reinforcing unit bulges upward. Because the frame reinforcing unit bulges upward, the top unit of the frame reinforcing unit is able to increase the amount of separation above the unlocking lever. Thus, a larger vertical stroke for the unlocking lever can be provided. This allows the front body structure for a vehicle to be applied to a vehicle such as an RV.

In accordance with one embodiment, the low strength portion is an open portion. Because the low strength portion is an open portion, the low strength portion (top unit) can be favorably deformed by an impact load inputted from above at the front of the vehicle. This allows an impact load inputted from above at the front of the vehicle to be advantageously absorbed by the frame reinforcing unit.

Also, because the low strength portion is an open portion, the open portion can be positioned above the unlocking lever. Thus, when the unlocking lever is operated, the unlocking lever can pass through the open portion. This allows the vertical range of movement to be unimpeded and the unlocking lever to operate favorably.

In addition, because the low strength portion is an open portion, a larger vertical stroke (amount of movement) can be provided for the unlocking lever. This allows the front body structure for a vehicle to be applied more favorably to a vehicle such as an RV.

In accordance with one embodiment, the front vehicle portion and the rear vehicle portion of the low strength portion are each substantially formed in a bowl shape, and the strength of the rear vehicle portion is greater than the strength of the front vehicle portion. Thus, the strength of the front vehicle portion enables the front vehicle portion to be deformed favorably by an impact load inputted from above at the front of the vehicle. This allows the front vehicle portion to be favorably deformed by an impact load inputted from above at the front of the vehicle, and the impact load to be favorably absorbed.

The rear vehicle portion may be positioned closer to the striker bracket than the front vehicle portion. Because the strength of the rear vehicle portion is also greater, the area of the hood frame surrounding the striker bracket can be reinforced by the rear vehicle portion. When the hood is closed, the striker contacts the hood locking device, and the load inputted to the striker can be favorably dispersed to the rear vehicle portion.

In accordance with one embodiment, a front tier unit is formed in the front vehicle portion and a rear tier unit is formed in the rear vehicle portion of the top reinforcing unit. Also, the number of tiers in the rear tier unit may be greater than the number of tiers in the front tier unit. By providing more tiers in the rear tier unit than the front tier unit, the cross-sectional area of the rear tier unit (the rear vehicle portion) can be increased. By increasing the cross-sectional area of the rear tier unit, the geometrical moment of inertia can be increased, and a strength that is greater than the front vehicle portion can be provided for the rear vehicle portion. When the hood is closed, the striker contacts the hood locking device, and the load inputted to the striker can be favorably dispersed to the rear tier unit (rear vehicle portion) surrounding the striker bracket.

If the number of tiers in the rear tier unit is greater than the number of tiers in the front tier unit, the rear tier unit can be formed in the frame hood within a large range. Thus, the rear tier unit (rear vehicle portion) can be provided near the striker bracket. When the hood is closed, the striker contacts the hood locking device, and the load inputted to the striker can be more favorably dispersed to the rear tier unit (rear vehicle portion) surrounding the striker bracket.

Having a greater number of tiers only in the rear tier unit increases the strength of the rear vehicle portion with respect to the front vehicle portion. Thus, the strength of the front tier unit (front vehicle portion) can be maintained so the front vehicle portion is favorably deformed by the impact load inputted from above at the front of the vehicle. Because the front vehicle portion is favorably deformed by the impact load, the impact load can be advantageously absorbed.

In other words, because the number of tiers in the rear tier unit is greater than the number of tiers in the front tier unit, the load inputted to the striker when the hood is closed can be favorably dispersed to the rear vehicle portion, and the impact load inputted from above at the front of the vehicle can be advantageously absorbed.

In accordance with one embodiment, a peripheral edge unit is provided on the periphery of the frame reinforcing unit in portions other than the front side of the vehicle, and the peripheral edge unit may be substantially C-shaped. Because the peripheral edge unit is substantially C-shaped, the strength of the frame reinforcing unit can be reduced. This allows the frame reinforcing unit to be favorably deformed by the impact load inputted from above in the front of the vehicle, and the impact load can be advantageously absorbed.

The peripheral edge unit may be provided on the periphery of the frame reinforcing unit in portions other than the front side of the vehicle. Thus, the peripheral edge unit can be provided in the vicinity of the striker bracket. When the hood is closed, the striker contacts the hood locking device, and the load inputted to the striker can be favorably dispersed to the peripheral edge unit.

In accordance with one embodiment, the reinforcement main body is provided on a downward slope along the hood skin towards the front of the vehicle. Thus, the reinforcement main body can be provided substantially perpendicular to an impact load inputted from above at the front of the vehicle. This allows an impact load inputted from above at the front of the vehicle to be favorably dispersed by the reinforcement main body. Because an impact load inputted from above at the front of the vehicle is favorably dispersed by the reinforcement main body, the impact load can be advantageously absorbed.

In accordance with one embodiment, a mounting unit for each front leg unit and a mounting unit for each rear leg unit is positioned on the hood frame. A mounting unit for each front leg unit and a mounting unit for each rear leg unit is provided around the striker bracket. Because a mounting unit for each front leg unit and a mounting unit for each rear leg unit is positioned on the hood frame, the area surrounding the striker bracket can be reinforced by the mounting units of the front leg units and the mounting units of the rear leg units. When the hood is closed, the striker contacts the hood locking device, and the load inputted to the striker can be favorably dispersed around the striker bracket.

In accordance with one embodiment, the reinforcement main body is provided along the hood skin to reinforce the hood skin. Thus, when hands are placed on the hood skin, the light load inputted to the hood skin (the load applied by the hands) can be supported by the reinforcement. This can prevent the hood skin from being deformed by the light load inputted to the hood skin.

In accordance with one embodiment, the reinforcement main body is equipped with a reinforcing bead, and the bead extends in the length direction of the vehicle. Thus, an impact load inputted from above at the front of the vehicle can be imparted favorably from the reinforcement main body to a rear leg unit. This allows the rear leg unit to be favorably deformed by an impact load inputted from above at the front of the vehicle, and the impact load to be advantageously absorbed.

Also, the reinforcement main body may be equipped with a reinforcing bead, so that a light load inputted to the hood skin can be supported by the reinforcement when, for example, hands are placed on the hood skin. This can prevent deformation of the hood skin by the light load inputted to the hood skin.

In accordance with one embodiment, each front leg unit has a front leg reinforcing unit, and each front leg reinforcing unit extends in a substantially vertical direction. Because each front leg unit has a front leg reinforcing unit, each front leg unit acts as a pivot or fulcrum supporting the reinforcement main body when an impact load is inputted to the reinforcement main body from above at the front of the vehicle.

Thus, when an impact load is inputted to the reinforcement main body from above at the front of the vehicle, the impact load is imparted to each rear leg unit, and each rear leg unit can be favorably deformed. This allows the reinforcement main body to move smoothly on the hood frame side with each front leg unit acting as a pivot or fulcrum, and the impact load can be favorably absorbed.

In accordance with one embodiment, the front leg reinforcing unit of each front leg unit extends in a substantially vertical direction, so that a light load inputted to the hood skin can be supported by each front leg unit when, for example, hands are placed on the hood skin. This can prevent deformation of the hood skin by the light load inputted to the hood skin.

In accordance with one embodiment, each rear leg unit is formed so as to gradually assume a narrower shape from the reinforcement main body towards the hood frame. Because each rear leg unit has a narrow shape, each rear leg unit can be favorably deformed by an impact load imparted to the rear leg unit. This allows each rear leg unit to be favorably deformed, and the impact load to be advantageously absorbed.

In accordance with one embodiment, an inner flange is provided on the inner edge of each rear leg main body, and an outer flange is provided on the outer edge of each rear leg main body. Each rear leg main body can be reinforced by the inner flange and the outer flange. Thus, by positioning a mounting unit for each rear leg unit on the hood frame, the area around the striker bracket can be reinforced. When the hood is closed, the striker contacts the hood locking device, and the load inputted to the striker can be favorably dispersed around the striker bracket.

Also, because each rear leg main body is reinforced by an inner flange and an outer flange, the light load inputted to the hood skin when, for example, hands are placed on the hood skin (the load applied by the hands) can be supported by each rear leg unit (i.e., reinforcement). This can prevent the hood skin from being deformed by the light load inputted to the hood skin.

In addition, an inner flange extends out from the inner portion of the inner edge of each rear leg main body except in the vicinity of the mounting unit. In other words, an inner flange is not provided in the vicinity of the mounting unit so that the strength is reduced in the vicinity of the mounting unit. Also, an outer flange extends out from the outer portion of the outer edge of each rear leg main body except in the vicinity of the reinforcement main body. In other words, an outer flange is not provided in the vicinity of the reinforcement main body so that the strength is reduced in the vicinity of the reinforcement main body.

Thus, each rear leg unit can be favorably deformed by an impact load imparted to the rear leg unit. This allows each rear leg unit to be favorably deformed, and the impact load to be advantageously absorbed.

In accordance with one embodiment, the mounting unit of each rear leg is provided on substantially the same line as the striker in the width direction of the vehicle. Thus, the portion of the hood frame on substantially the same line as the striker in the width direction of the vehicle can be reinforced by the mounting unit of each rear leg unit. When the hood is closed, the striker contacts the hood locking device, and the load inputted to the striker can be favorably dispersed to the mounting unit of each rear leg unit.

In accordance with one embodiment, a front leg support unit provided to engage a mounting unit for a front leg unit bulges upward, and a rear leg support unit provided to engage a mounting unit for a rear leg unit bulges upward. Thus, the strength of each front leg support unit and rear leg support unit can be increased. When the hood is closed, the striker contacts the hood locking device, and the load inputted to the striker can be favorably dispersed to the front leg support unit and rear leg support unit.

Also, because the strength of each front leg support unit and rear leg support unit is increased, the light load inputted to the hood skin when hands are placed on the hood skin (the load applied by the hands) can be supported by each front leg support unit and rear leg support unit. This can prevent the hood skin from being deformed by the light load inputted to the hood skin.

In accordance with one embodiment, a vehicle hood is provided including a frame that is hingedly securable to a vehicle body structure. The frame includes a first side and a second side. A skin covers the first side of the frame and a striker bracket is secured to the frame. The striker bracket includes a striker extending from the second side of the frame for engaging a latching mechanism on the vehicle body structure. A reinforcement is secured to the frame and positioned between at least a portion of the skin and the striker bracket.

The reinforcement may be positioned adjacent the skin and may include a first leg extending therefrom to form a pivot with the frame, and a second leg extending therefrom to engage the frame. The second leg may be configured to deform in response to an impact applied to the skin to rotate the reinforcement toward the frame.

The second leg may narrow as it extends from the reinforcement to the frame, and may include a first point positioned adjacent the frame that is configured to deform in response to the impact applied to the skin, and a second point positioned adjacent the reinforcement that is configured to deform after deformation of the first point.

In accordance with one embodiment, a vehicle hood is provided that includes a frame hingedly securable to a vehicle body structure. The frame includes a first side and a second side. A skin covers the first side, and a striker bracket secured to the frame includes a striker extending from the second side of the frame for engaging a locking device on the vehicle body structure. The locking device includes an unlocking lever. A reinforcing unit extends from the first side of the frame toward the skin and defines a cavity on the second side of the frame. The cavity is positioned to receive at least a portion of the unlocking lever during disengagement of the striker from the locking device.

The reinforcing unit may be provided with an opening to allow at least a portion of the lever to extend therethrough during disengagement of the striker from the locking device.

The reinforcing unit may include a base with a first wall and a second wall. The second wall may be positioned on the first side of the frame between the first wall and the striker bracket. The second wall may be stronger than the first wall. The first wall may include at least one tier, and the second wall may include at least one tier more than the first wall.

DETAILED DESCRIPTION

The apparatus and methods disclosed in this document are described in detail by way of examples and with reference to the annexed drawings. Here, front (Fr), rear (Rr), left (L), and right (R) are the directions as viewed from the perspective of the driver. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Figure 1:
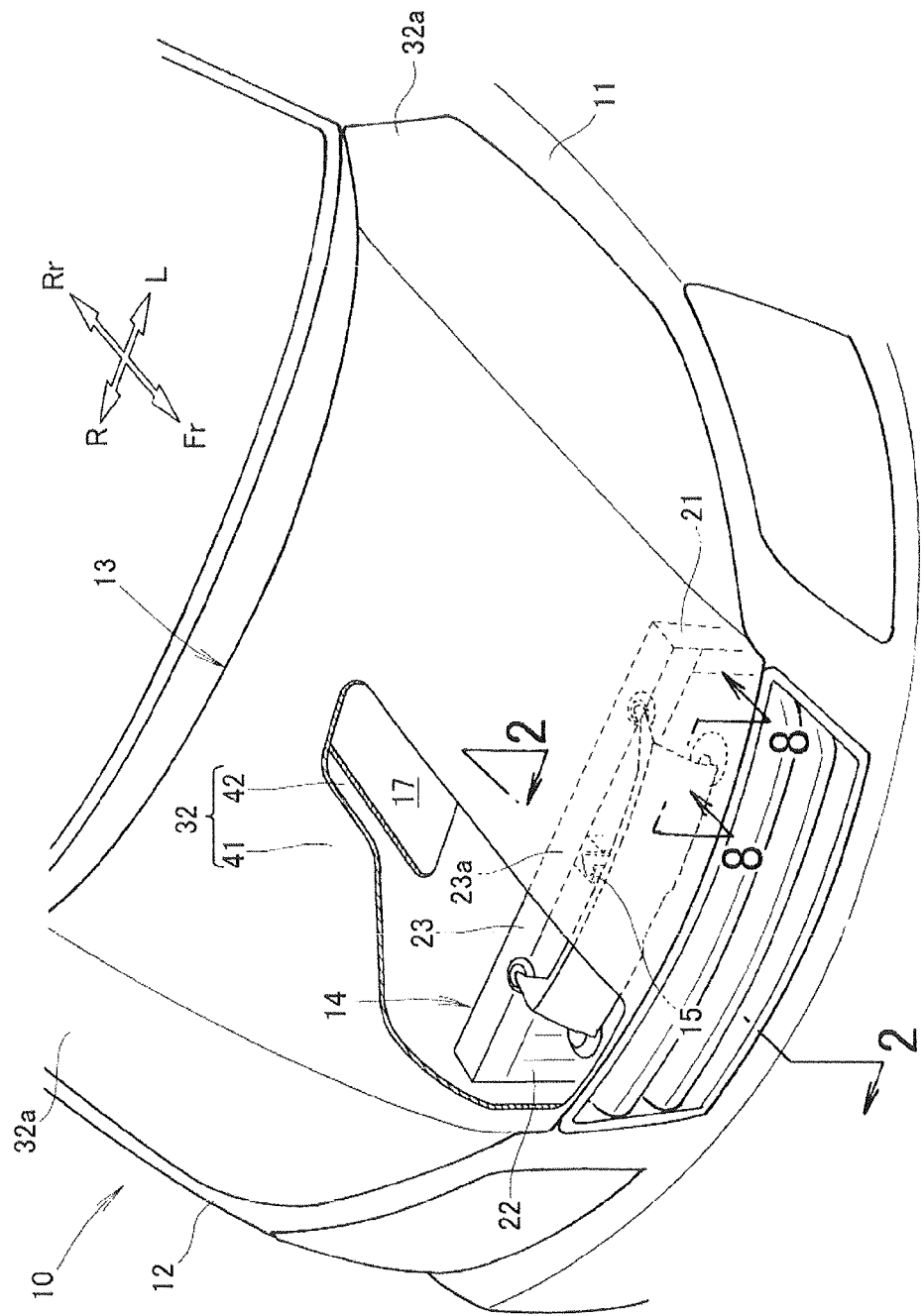
FIG. 1 is a perspective view showing a front body structure for a vehicle according to one embodiment of the present disclosure.

As shown in FIG. 1, a front body structure for a vehicle 10 has left and right front fenders 11, 12 provided on the left and right of the front body structure 10, a hood unit 13 provided between the left and right front fenders 11, 12, a bulkhead 14 provided below the hood unit 13, and a hood locking device 15 provided in the bulkhead 14. Although the present disclosure is described herein with respect to a hood unit 13, a hood 32, and a front bulkhead 14, it is to be understood that the present disclosure is not limited to such, and may be applied to a rear body structure including a trunk (not shown). Accordingly, the present disclosure is not limited to the front of the vehicle.

The front body structure for a vehicle 10 may also be provided with a radiator 18 in front of the bulkhead 14 (see FIG. 2), and a bumper grille 19 provided in front of the radiator 18. This front body structure for a vehicle 10 can be applied to any vehicle, such as an RV.

The bulkhead 14 is a member provided below the hood unit 13 (hood 32) and demarcating the front of the engine compartment 17. In the bulkhead 14, an upper member 23 bridges a left leg 21 and a right leg 22. The hood locking device 15 may be provided in the center 23a of the upper member 23 in the width direction of the vehicle.

Figure 2:
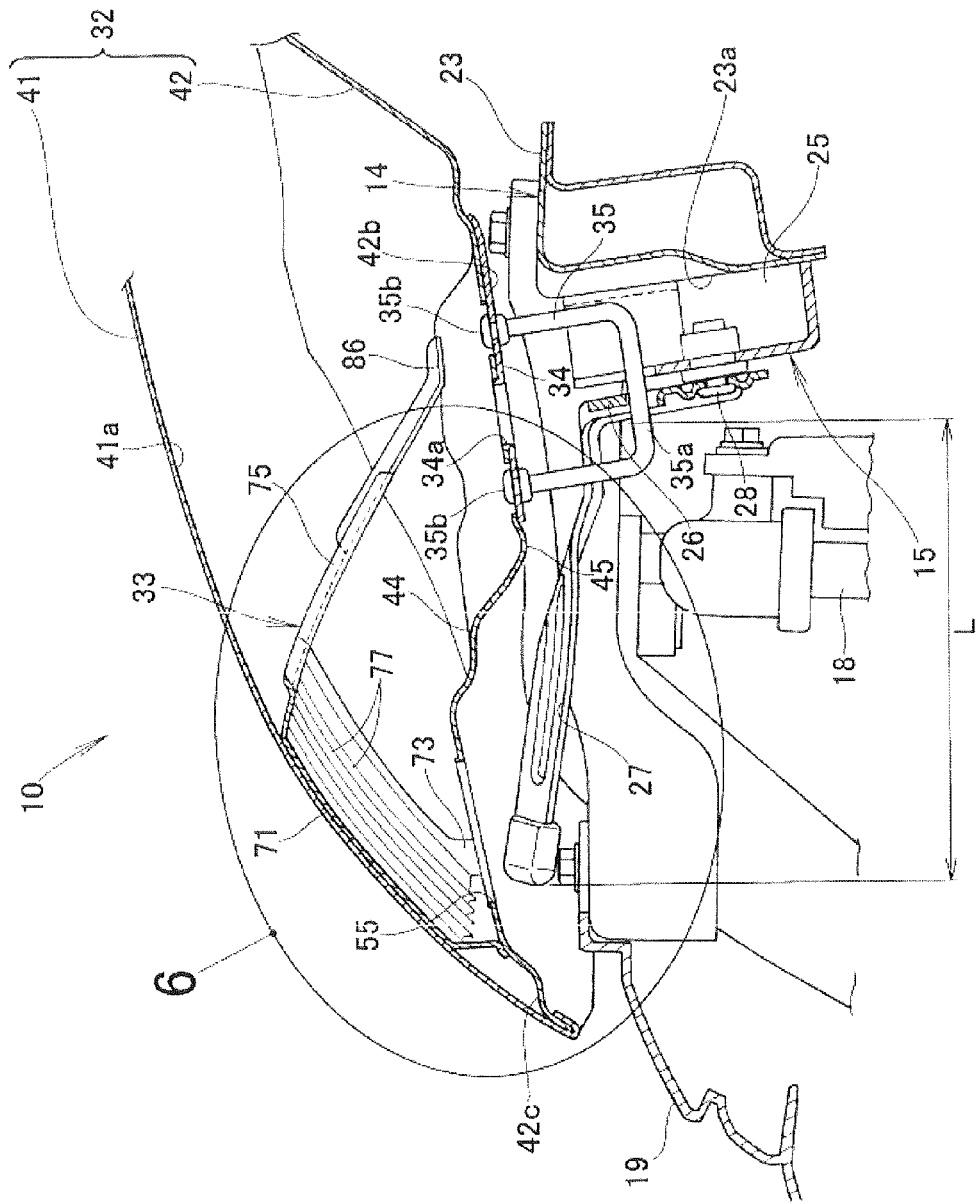
FIG. 2 is a cross-sectional view from line 2-2 in FIG. 1.
Figure 3:
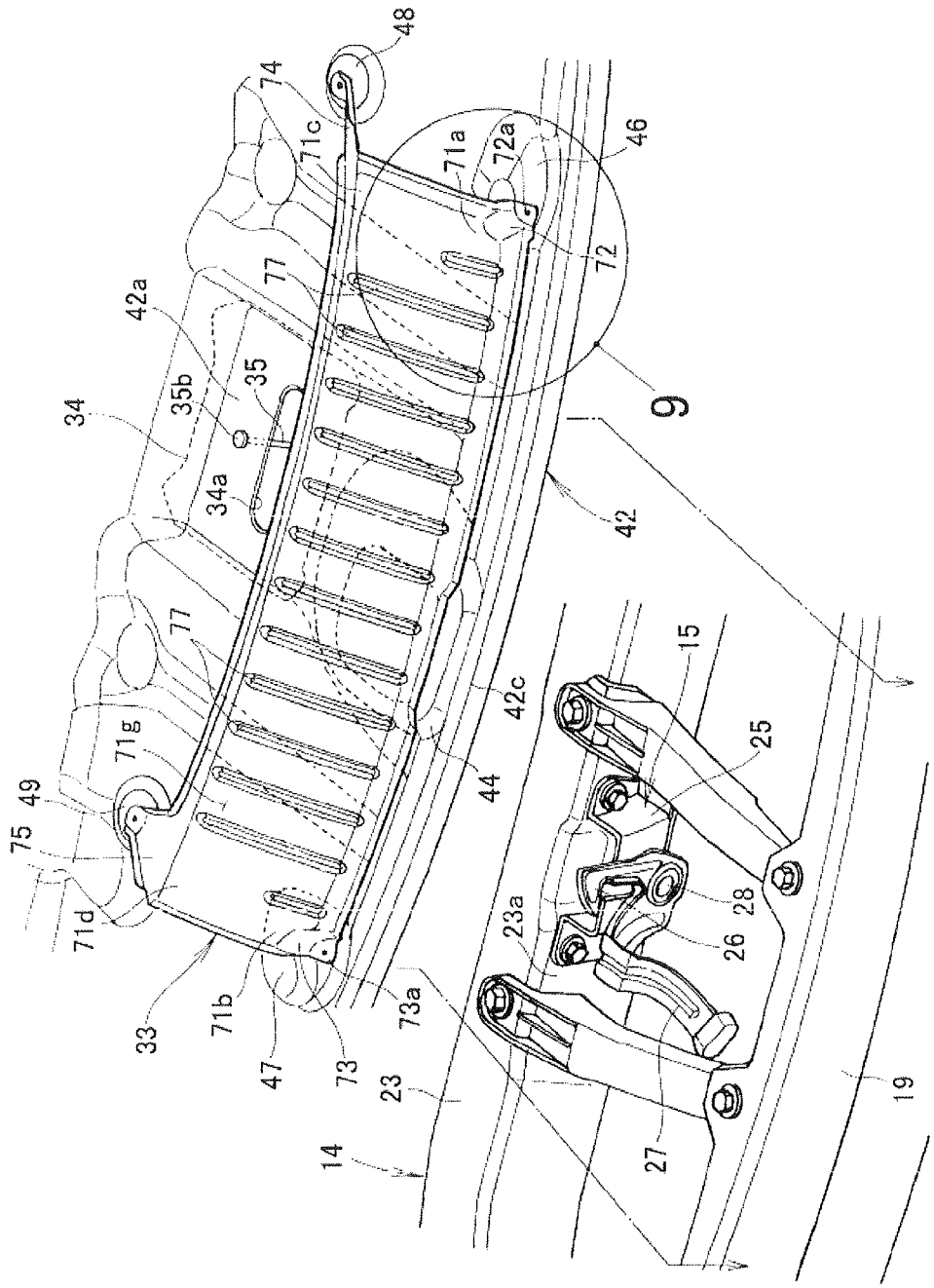
FIG. 3 is an exploded perspective view showing the front body structure of FIG. 1.

The hood locking device 15 shown in FIG. 2 and FIG. 3 is a device used in a typical vehicle, and has a lock unit 25 provided in the center 23a of an upper member 23 in the width direction of the vehicle, and a locking hook 26 and an unlocking lever 27 provided in the lock unit 25. The locking hook 26 and the unlocking lever 27 form an integrated unit, and are provided in the lock unit 25 rotatably via a support shaft 28.

The locking hook 26 is an arm that is able to engage the bottom unit 35a of the striker 35. The unlocking lever 27 is a lever extending towards the front of the vehicle from the locking unit 25, and is arranged below a frame reinforcing unit 44.

Here, the distance from the front bulkhead 14 to the front bumper beam (not shown) is great in the front body structure 10 of a vehicle such as an RV in order to ensure the absorption of impact loads. Therefore, the hood unlocking device 15 is provided with an unlocking lever 27 that extends further towards the front of the vehicle, and the overall length L of the unlocking lever 27 is greater.

By moving the unlocking lever 27 upwards, the locking hook 26 (lock unit 25) can move to the unlocked position. By moving the locking hook 26 to the unlocked position, the striker 35 engaged by the lock unit 26 is released.

When the striker 35 is engaged by the lock unit 25, the hood 32 is secured in the closed position. When the striker 35 engaged by the lock unit 25 is to be released, the hood 32 is raised slightly but engaged by the locking hook 26. The unlocking lever 27 is operated upwards in this state to separate the locking hook 26 from the striker 35.

The striker 35 engaged by the locking hook 26 is released by separating the locking hook 26 from the striker 35. When the hood 32 is lifted after the striker 35 engaged by the locking hook 26 has been released, the hood 32 is released.

The hood unit 13 includes a vertically openable and closable hood 32 provided between left and right front fenders 11, 12, reinforcement (reinforcing member) 33 provided in the hood 32, a striker bracket 34 provided below the reinforcement 33, and a striker 35 provided in the striker bracket 34.

The hood 32 has a hood skin 41 forming the exterior surface of the front body structure for the vehicle 10, and a hood frame 42 provided on the reverse side 41a of the hood skin 41. The peripheral edges of the hood skin 41 and the hood frame 42 are crimped with each other to form an integrated unit. The hood 32 is supported on the frame of the front body structure 10 (framework) using left and right end units 32a (see FIG. 1) as fulcrums so the hood can be opened and closed.

The striker bracket 34 may be provided in the center 42a of the hood frame 42 in the width direction of the vehicle on the bottom surface 42b (the surface on the engine compartment 17 side) adjacent to and to the rear of the frame reinforcing unit 44. The striker bracket 34 may be formed in a substantially rectangular shape, and an opening 34a extending in the width direction of the vehicle may be provided.

A striker 35 is provided in the striker bracket 34. The striker 35 is formed substantially in a C-shape as viewed from the side, and has a rod bottom unit 35a that can engage the lock unit 26. The upper front end 35b and the upper rear end 35b of the striker 35 are crimped with and mounted in the striker bracket 34. By mounting the upper front and rear ends 35b to the striker bracket 34, the striker 35 is arranged in the length direction of the vehicle and protrudes downward from the striker bracket 34.

Figure 4:
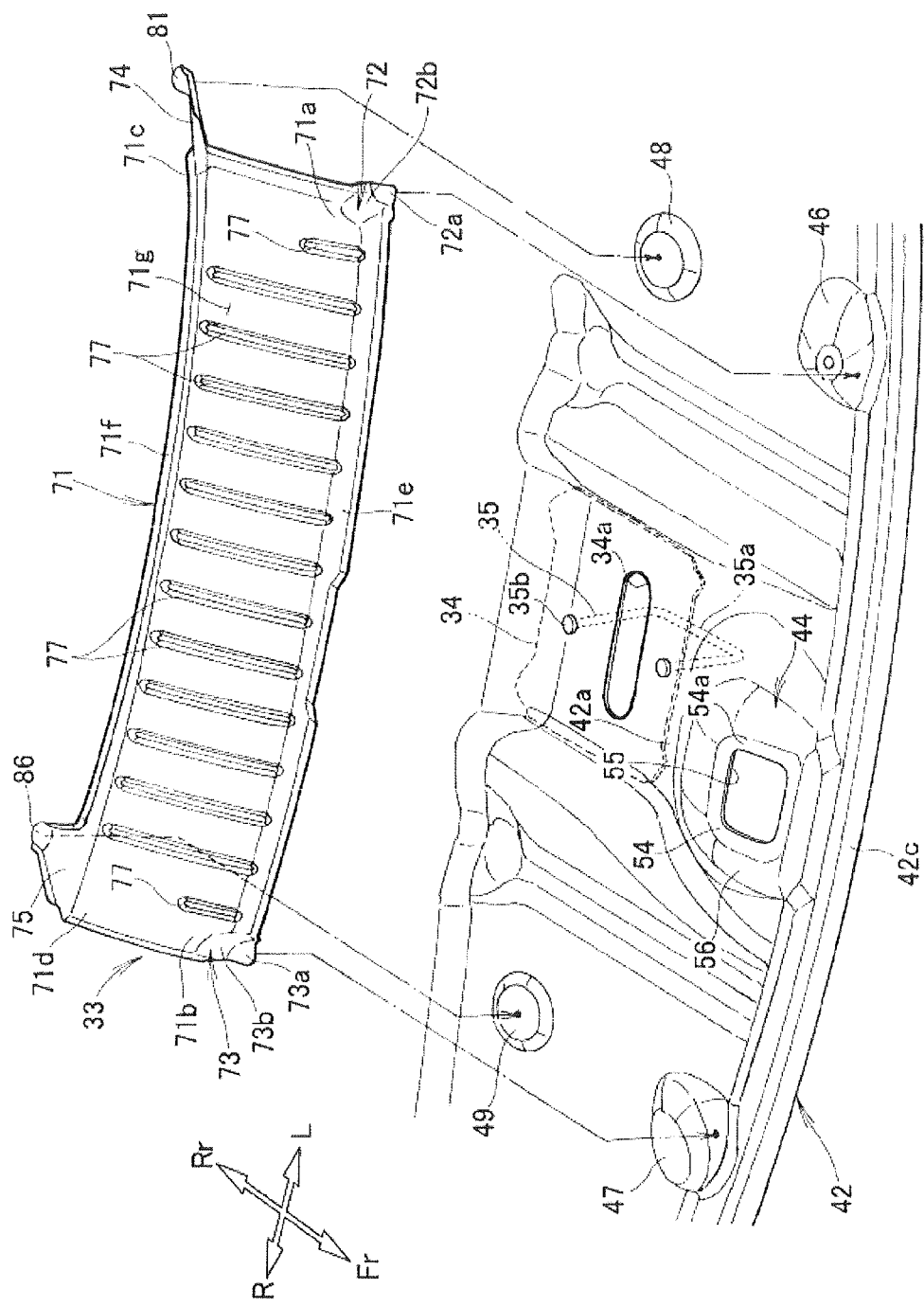
FIG. 4 is a perspective view showing the disassembled reinforcement in FIG. 3.

As shown in FIG. 4, the hood frame 42 has a frame reinforcing unit 44. A peripheral edge unit 45 (see FIG. 6), left and right front leg support units (front leg support units) 46, 47, and left and right rear leg support units (rear leg support units) 48, 49 are provided around the frame reinforcing unit 44. The frame reinforcing unit 44, the left and right front leg support units 46, 47, and the left and right rear leg support units 48, 49 are parts that bulge upward to reinforce the hood frame 42. The peripheral edge unit 45 is a portion that bulges downward to reinforce the hood frame 42.

Figure 5:
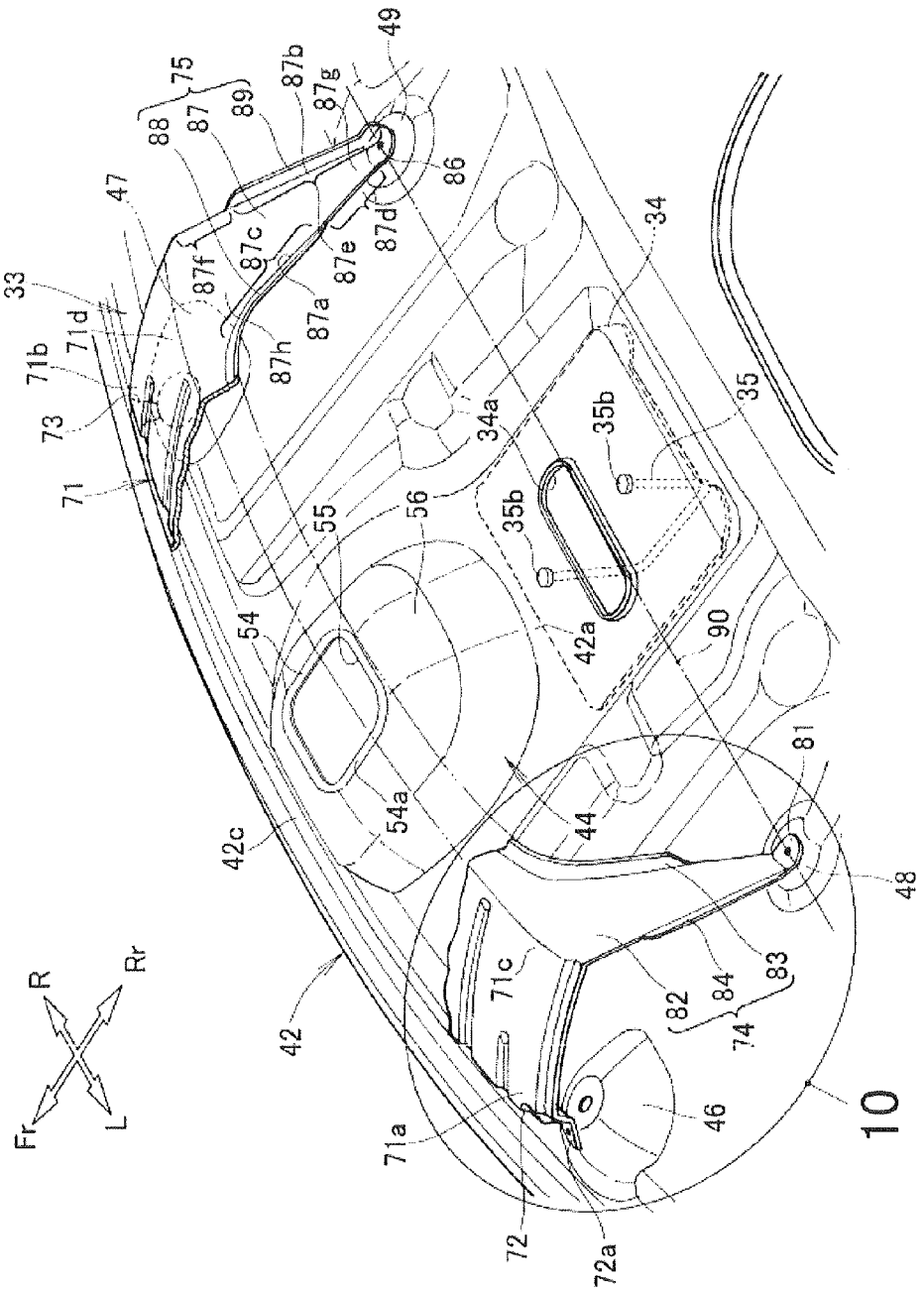
FIG. 5 is a perspective view showing the hood frame in FIG. 3 as viewed from the rear.

As shown in FIG. 4 and FIG. 5, the frame reinforcing unit 44 may be provided in the hood frame 42 in front of the striker bracket 34 with respect to the vehicle (specifically, between the striker bracket 34 and the front end unit 42c of the hood frame 42). The frame reinforcing unit 44 may be provided in the center 42a of the hood frame 42 in the width direction of the vehicle.

The frame reinforcing unit 44 bulges upward towards the hood skin 41. Because the frame reinforcing unit 44 bulges upward, the strength of the frame reinforcing unit 44 is ensured. Because the strength of the frame reinforcing unit 44 is ensured, the hood frame 42 can be reinforced by the frame reinforcing unit 44.

The frame reinforcing unit 44 has a top unit 54 bulging upward towards the hood skin 41 and inclined towards the front of the vehicle, a low strength portion 55 provided in the top unit 54 having less strength than the periphery 54a of the top unit 54, and a base 56 (hereinafter referred to as "the top reinforcing unit 56"). The top reinforcing unit 56 may be provided continuously with the periphery 54a of the top unit 54 for reinforcing the top unit 54.

Figure 6:
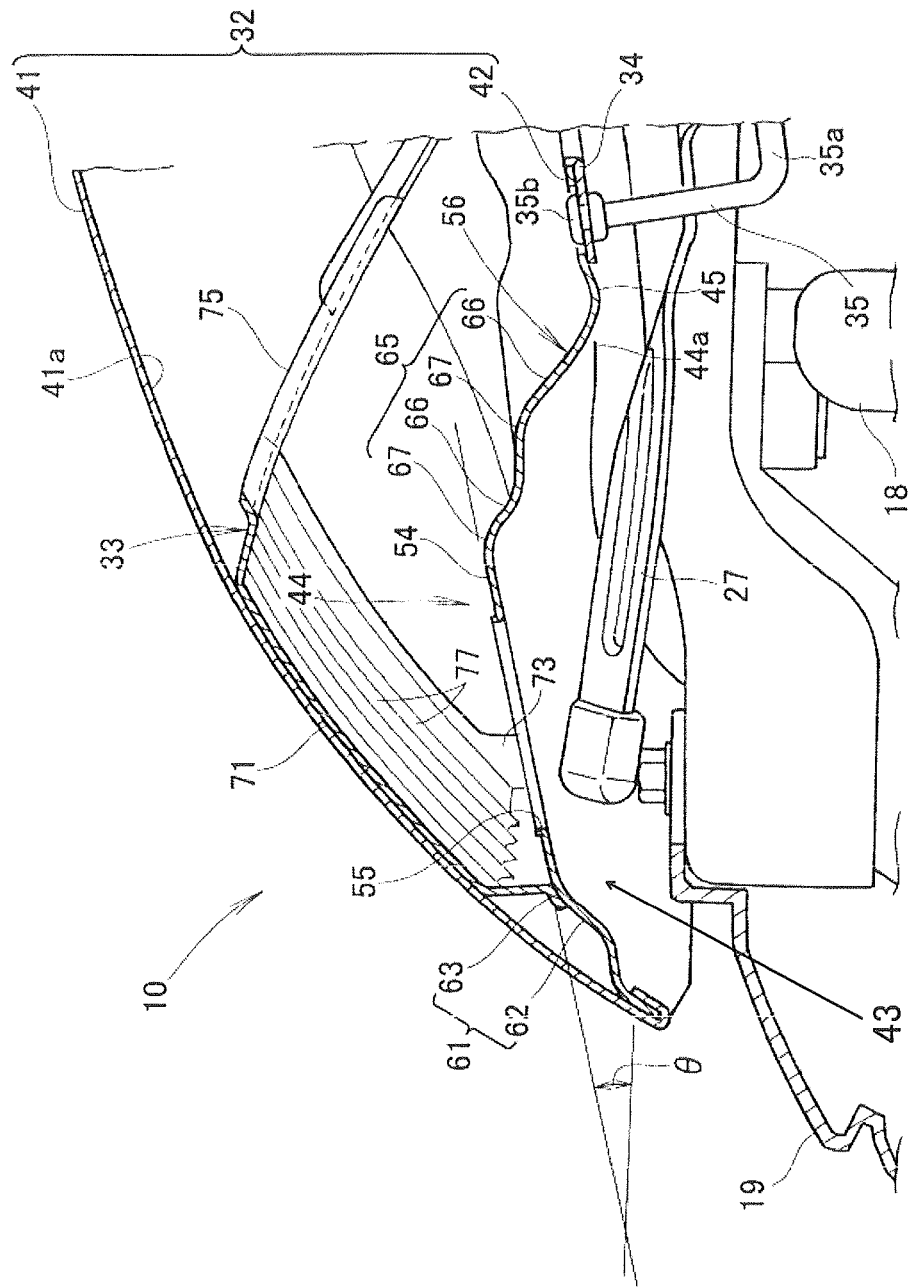
FIG. 6 is a portion of a view of FIG. 2 enlarged for magnification purposes.

As shown in FIG. 6, the top unit 54 is arranged above the unlocking lever 27 and is inclined at angle of inclination θ towards the front of the vehicle. Because the top unit 54 is inclined towards the front of the vehicle, an impact load inputted from above at the front of the vehicle can be advantageously confronted. Thus, an impact load inputted from above at the front of the vehicle can be effectively sustained by the top unit 54 and favorably imparted to the frame reinforcing unit 44.

Figure 7:
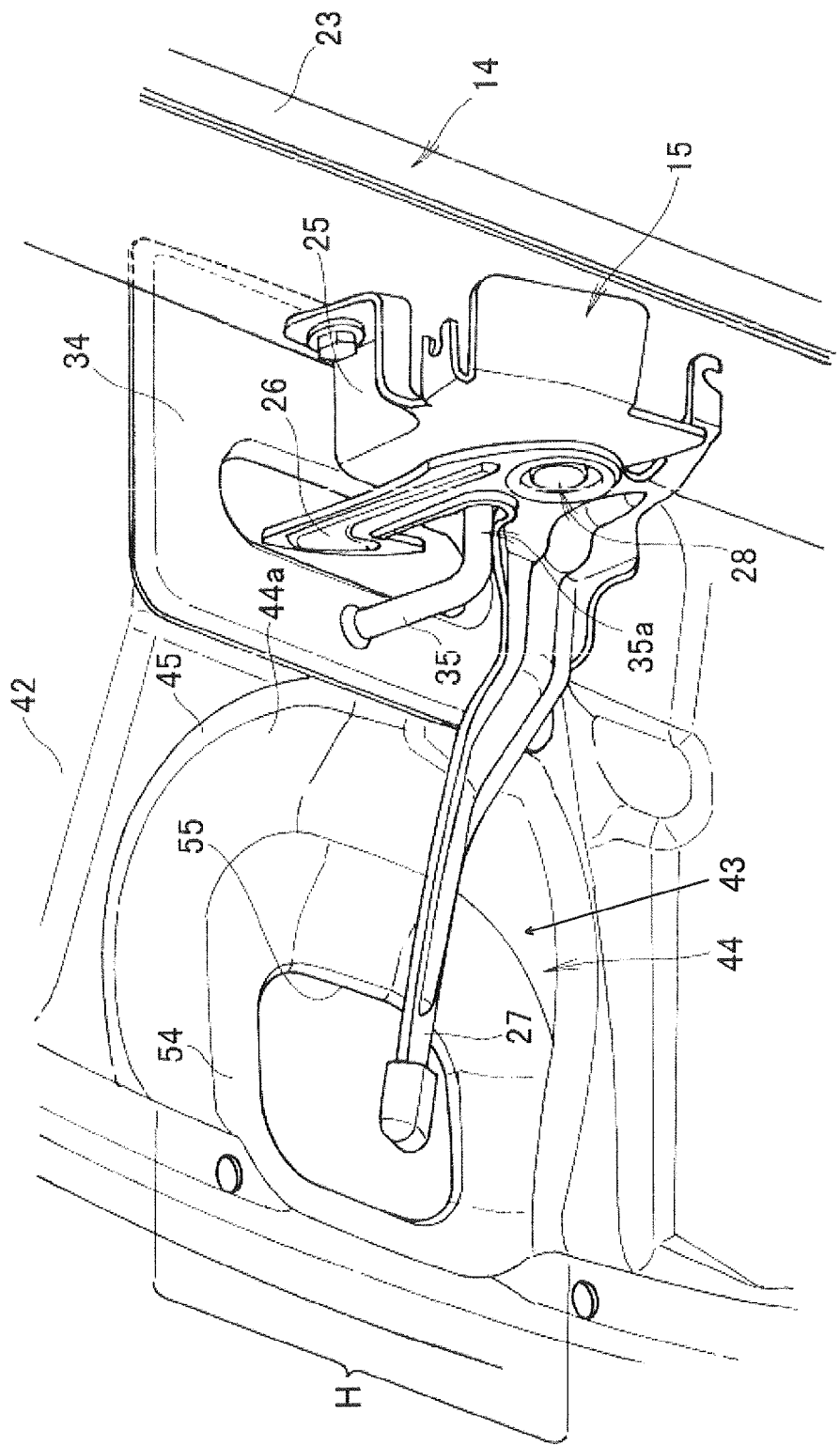
FIG. 7 is a perspective view showing the frame reinforcing unit in FIG. 5 as viewed from below.

As shown in FIG. 7, the low strength portion 55 is an open portion formed substantially in the shape of a rectangular opening. Thus, the frame reinforcing unit 44 bulges above the unlocking lever 27, and the low strength portion 55 in the top unit 54 is formed in the shape of an opening.

Because the frame reinforcing unit 44 bulges upward, it defines a cavity 43 on the opposite side of the hood frame 42. Accordingly, the top unit 54 of the frame reinforcing unit 44 can be separated sufficiently above the unlocking lever 27. Also, because the low strength portion 55 may be an open portion, the unlocking lever 27 can pass through the open portion. Thus, a larger vertical stroke (amount of movement) for the unlocking lever 27 can be provided.

In addition, because the low strength portion 55 may be an open portion, the low strength portion 55 (top unit 54) can be favorably deformed by an impact load inputted from above at the front of the vehicle. This allows an impact load inputted from above at the front of the vehicle to be advantageously absorbed by the frame reinforcing unit 44.

In the top reinforcing unit 56, as shown in FIG. 6, the front vehicle portion 61 is positioned towards the front of the low strength portion 55 with respect to the vehicle, and the rear vehicle portion 65 is positioned towards the rear of the low strength portion 55 with respect to the vehicle. The front vehicle portion 61 is formed substantially so as to have a bowl shape with a single tier. The rear vehicle portion 65 is formed substantially so as to have a bowl shape with two tiers.

The front vehicle portion 61 has a front curved portion 62 with one tier formed substantially in the shape of a bowl. It thus has a front tiered unit 63 with one tier. The rear vehicle portion 65 has a rear curved portion 66 with two tiers formed substantially in the shape of a bowl. It thus has a rear tiered unit 67 with two tiers.

In other words, the number of tiers in the rear tier unit 67 is greater than the number of tiers in the front tier unit 63. Increasing the number of tiers only in the rear tier unit 67 reliably increases only the strength of the rear vehicle portion 65. Thus, the strength of the front tier unit 63 (front vehicle portion 61) can be maintained so as to be favorably deformed by an impact load inputted from above at the front of the vehicle. Because the front vehicle portion 61 is favorably deformed by an impact load inputted from above at the front of the vehicle, the impact load can be advantageously absorbed.

The following is a more detailed explanation of the reason the number of tiers in the rear tier unit 67 is greater than the number of tiers in the front tier unit 63.

As shown in FIG. 6 and FIG. 7, a peripheral edge unit 45 is provided in the hood frame 42 on the periphery 44a of the frame reinforcing unit 44 (except in the front region H of the periphery 44a). The peripheral edge unit 45 bulges downward in the hood frame 42. Because the peripheral edge unit is provided except in the front region H in the front of the vehicle, it is substantially C-shaped when viewed from above.

Because a peripheral edge unit 45 is provided except in the front region H in the front of the vehicle, the strength of the frame reinforcing unit 44 can be reduced. This allows the frame reinforcing unit 44 to be favorably deformed by an impact load inputted from above at the front of the vehicle, and the impact load to be advantageously absorbed.

As shown in FIG. 4 and FIG. 5, the left and right front leg support units 46, 47 bulge upwards. Because the left and right front leg support units 46, 47 bulge upwards, the hood frame 42 can be reinforced by the left and right front leg support units 46, 47. The left and right front leg support units 46, 47 are provided at the front end units 42c of the hood frame 42 to the left and right of the frame reinforcing unit 44.

In other words, the left and right front leg support units 46, 47 are provided around the striker bracket 34 (to the left and right in front). A left front leg unit 72 of the reinforcement 33 described below is provided in the left front leg support unit 46. A right front leg unit 73 of the reinforcement 33 described below is provided in the right front leg support unit 47.

The left and right rear leg support units 48, 49 bulge upwards. Because the left and right rear leg support units 48, 49 bulge upwards, the hood frame 42 can be reinforced by the left and right rear leg support units 48, 49. The left and right rear leg support units 48, 49 are provided to the right and left of the striker bracket 34 on substantially the same line as the striker 35 in the width direction of the vehicle (more specifically, on the same line 90, indicated by a dashed line in the figure, extending in the width direction of the vehicle).

In other words, the left and right front rear support units 48, 49 are provided around the striker bracket 34 (to the left and right). A left rear leg unit 74 of the reinforcement 33 described below is provided in the left rear leg support unit 48. A right rear leg unit 75 of the reinforcement 33 described below is provided in the right rear leg support unit 49.

Here, as shown in FIG. 2, when the hood 32 is closed, the rod bottom unit 35a of the striker 35 contacts the hood locking device 15, and a load is inputted to the striker 35. Thus, a frame reinforcing unit 44 for reinforcing the hood frame 42 is provided in the hood frame 42 in front of the striker bracket 34 with respect to the vehicle. Also, left and right front leg support units 46, 47 and left and right rear leg support units 48, 49 (see FIG. 4) are provided around the striker bracket 34.

Thus, as shown in FIG. 4, the area surrounding the striker bracket 34 in the hood frame 42 can be reinforced by the frame reinforcing unit 44, the left and right front leg support units 46, 47, and the left and right rear leg support units 48, 49. When the hood 32 is closed, the load inputted to the striker 35 can be favorably dispersed to the frame reinforcing unit 44, the left and right front leg support units 46, 47, and the left and right rear leg support units 48, 49.

Also, as shown in FIG. 6, a top reinforcing unit 56 is provided in the frame reinforcing unit 44. Because a top reinforcing unit 56 is provided in the frame reinforcing unit 44, the strength of the frame reinforcing unit 44 can be ensured. When the hood 32 is closed, the load inputted to the striker 35 can be more favorably dispersed to the frame reinforcing unit 44.

Furthermore, the rear vehicle portion 65 is positioned closer to the striker bracket 34 than the front vehicle portion 61. Thus, by increasing the strength of the rear vehicle portion 65, the area of the hood frame 42 around the striker bracket 34 can be reinforced by the rear vehicle portion 65. When the hood 32 is closed, the load inputted to the striker 35 can be more favorably dispersed to the rear vehicle portion 65.

In addition, a peripheral edge unit 45 is provided on the periphery 44a of the frame reinforcing unit 44 except in the front region H towards the front of the vehicle (see FIG. 7). Thus, a peripheral edge unit 45 can be provided in the vicinity of the striker bracket 34. When the hood 32 is closed, the load inputted to the striker 35 can be more favorably dispersed to the peripheral edge unit 45.

The following is a more detailed explanation of the reason the number of tiers in the rear tier unit 67 is greater than the number of tiers in the front tier unit 63. By increasing the number of tiers in the rear tier unit 67 relative to the number of tiers in the front tier unit 63, the cross-sectional area of the rear tier portion 67 (front vehicle portion 65) can be increased. By increasing the cross-sectional area of the rear vehicle unit 65, the geometrical moment of inertia of the rear vehicle unit 65 can be increased, and a rear vehicle portion 65 having strength greater than the front vehicle portion 61 can be ensured. When the hood 32 is closed, the rod bottom unit 35a of striker 35 contacts the hood locking device 15, and the load inputted to the striker 35 can be favorably dispersed to the rear vehicle portion 65 around the striker bracket 34.

In addition, by increasing the number of tiers in the rear tier unit 67 relative to the number of tiers in the front tier unit 63, the rear tier unit 67 can be formed in a larger region of the hood frame 42. Thus, the rear tier unit 67 can be provided in the vicinity of the striker bracket 34. When the hood 32 is closed, the load inputted to the striker 35 can be favorably dispersed to the rear tier unit 67.

Meanwhile, increasing the number of tiers only in the rear tier unit 67 reliably increases only the strength of the rear vehicle portion 65. Thus, the strength of the front tier unit 63 (front vehicle portion 61) can be maintained so that is favorably deformed by an impact load inputted from above at the front of the vehicle. Because the front vehicle portion 61 is favorably deformed by the impact load, the impact load can be advantageously absorbed.

In other words, by increasing the number of tiers in the rear tier unit 67 relative to the number of tiers in the front tier unit 63, an impact load inputted to the striker 35 when the hood 32 is closed can be favorably dispersed to the vehicle rear portion 65, and an impact load inputted from above at the front of the vehicle can be absorbed by the front vehicle portion 61.

As shown in FIG. 4 and FIG. 5, reinforcement 33 is provided for the hood frame 42. The reinforcement 33 includes a reinforcement main body 71 arranged between the frame reinforcing unit 44 and the hood skin 41 (see also FIG. 6). Left and right front leg units (pair of front leg units) 72, 73 may be provided at the lower left and right ends (both lower ends, both front ends) 71a, 71b of the reinforcement main body 71. Left and right rear leg units (pair of rear leg units) 74, 75 may be provided at the upper left and right ends (both upper ends, both front ends) 71c, 71d of the reinforcement main body 71.

The reinforcement main body 71 may be substantially formed in a rectangular shape and may be provided on a downward slope along the hood skin 41 towards the front of the vehicle (see FIG. 6). The reinforcement main body 71 may be equipped with one or more beads 77 extending in the length direction of the vehicle.

When the reinforcement main body 71 is provided on a downward slope towards the front of the vehicle, the reinforcement main body 71 can be provided substantially perpendicular to an impact load inputted from above at the front of the vehicle. This allows an impact load inputted from above at the front of the vehicle to be favorably dispersed by the reinforcement main body 71, and the impact load to be advantageously absorbed.

Figure 8:
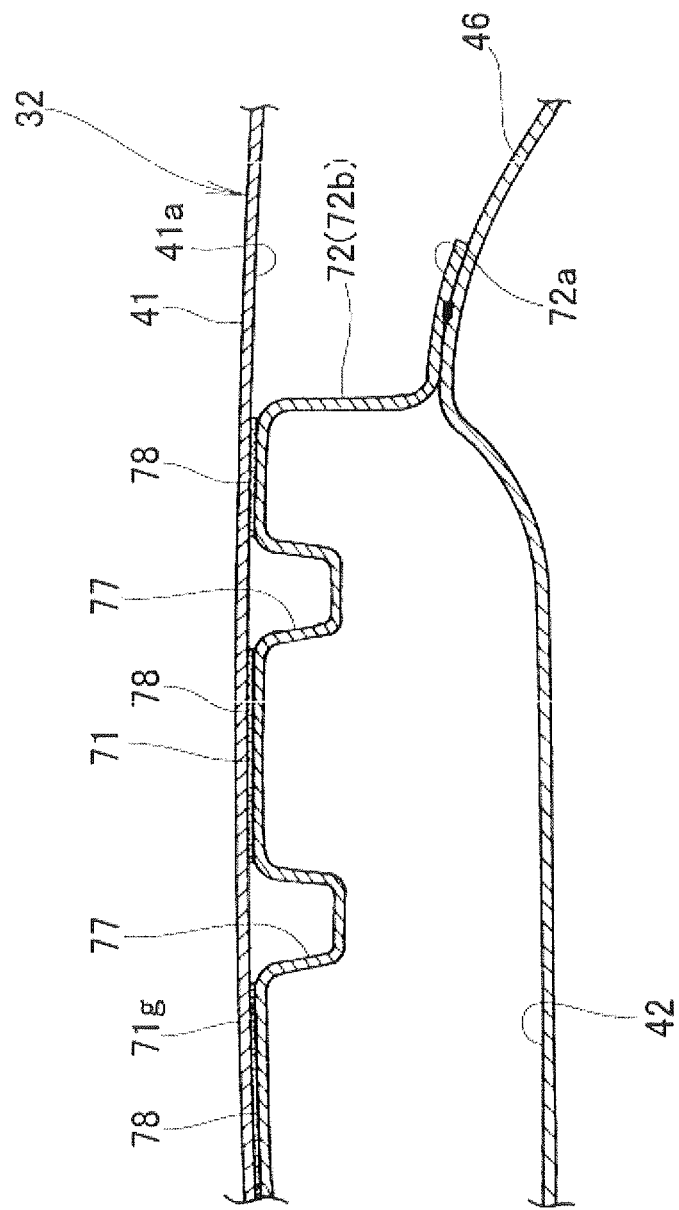
FIG. 8 is a cross-sectional view from line 8-8 in FIG. 1.

One or more beads 77 may be provided at a predetermined interval in the width direction of the vehicle, and may extend from the front end unit 71e to the rear end unit 71f of the reinforcement main body 71. As shown in FIG. 8, the beads 77 bulge downwards from the obverse side 71g of the reinforcement main body 71. Because beads 77 are provided in the reinforcement main body 71, the reinforcement main body 71 can be reinforced by the beads 77. The obverse side 71g of the reinforcement main body 71 may bonded to the rear surface 41a of the hood skin 41 using a bonding agent 78.

As shown in FIG. 4, because the reinforcement main body 71 is equipped with reinforcing beads 77 and the beads 77 extend in the length direction of the vehicle, an impact load inputted from above at the front of the vehicle can be favorably imparted from the reinforcement main body 71 to the left and right rear leg units 74, 75 (described below). This may be used to help the left and right rear units 74, 75 to be favorably deformed by an impact load inputted from above at the front of the vehicle, and helps to allow the impact load to be advantageously absorbed.

Figure 9:
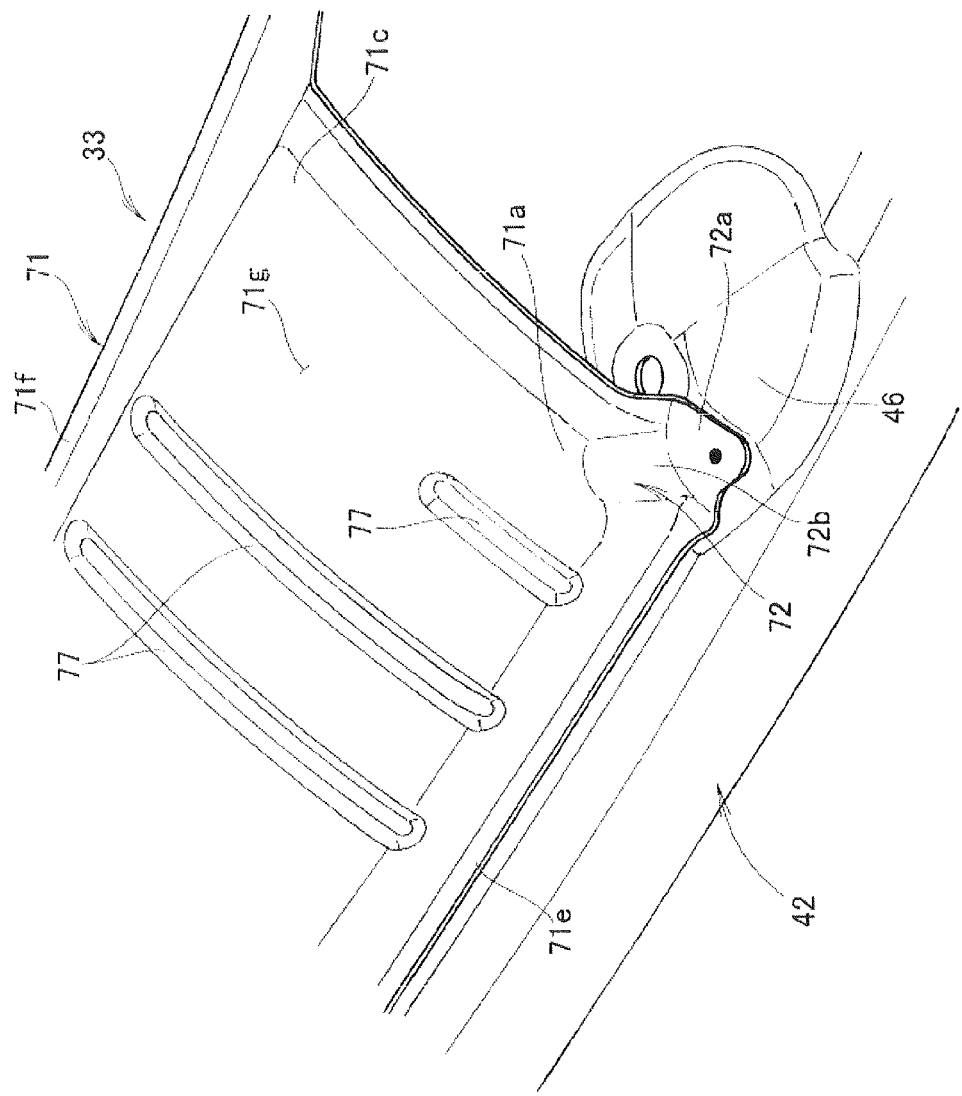
FIG. 9 is a portion of a view of FIG. 3 enlarged for magnification purposes.

The left and right front leg units 72, 73 are provided at the lower left and right ends 71a, 71b of the reinforcement main body 71. As shown in FIG. 9, the left front leg unit 72 is suspended from the lower left end 71a of the reinforcement main body 71 to the left front leg support unit 46 of the hood frame 42, and a mounting unit 72a is provided in the left front leg support unit 46. By providing the mounting unit 72a for the left front leg unit 72 in the left front leg support unit 46, the mounting unit 72a can be provided on the periphery (front left side) of the striker bracket 34 (see FIG. 4).

The left front leg unit 72 has a left front leg reinforcing unit (front leg reinforcing unit) 72b formed in a concave shape towards the inside of the reinforcement main body 71. The front leg reinforcing unit 72b extends in a substantially vertical direction from the lower left end 71a of the reinforcement main body 71 to the left front leg support unit 46 of the hood frame 42. By equipping the left front leg unit 72 with a left front leg reinforcing unit 72b, the left front leg unit 72 can be formed with relatively high strength.

As shown in FIG. 4, the right front leg unit 73 is symmetrical to the left front leg unit 72. It is suspended from the lower right end 71b of the reinforcement main body 71 to the right front leg support unit 47 of the hood frame 42, and a mounting unit 73a is provided in the right front leg support unit 47. By providing the mounting unit 73a for the right front leg unit 73 in the right front leg support unit 47, the mounting unit 73a can be provided on the periphery (front right side) of the striker bracket 34.

The right front leg unit 73 has a right front leg reinforcing unit (front leg reinforcing unit) 73b formed in a concave shape towards the inside of the reinforcement main body 71. The right front leg reinforcing unit 73b extends in a substantially vertical direction from the lower right end 71b of the reinforcement main body 71 to the right front leg support unit 47 of the hood frame 42. By equipping the right front leg unit 73 with a right front leg reinforcing unit 73b, the right front leg unit 73 can be formed with relatively high strength.

Because the left and right front leg units 72, 73 are formed with relatively high strength in this way, the left and right front leg units 72, 73 act as a pivot or fulcrum supporting the reinforcement main body 71 when an impact load is inputted to the reinforcement main body 71 from above at the front of the vehicle. Thus, when an impact load is inputted to the reinforcement main body 71 from above at the front of the vehicle, the impact load is imparted to the left and right rear leg units 74, 75, and the left and right rear leg units 74, 75 are favorably deformed.

Figure 10:
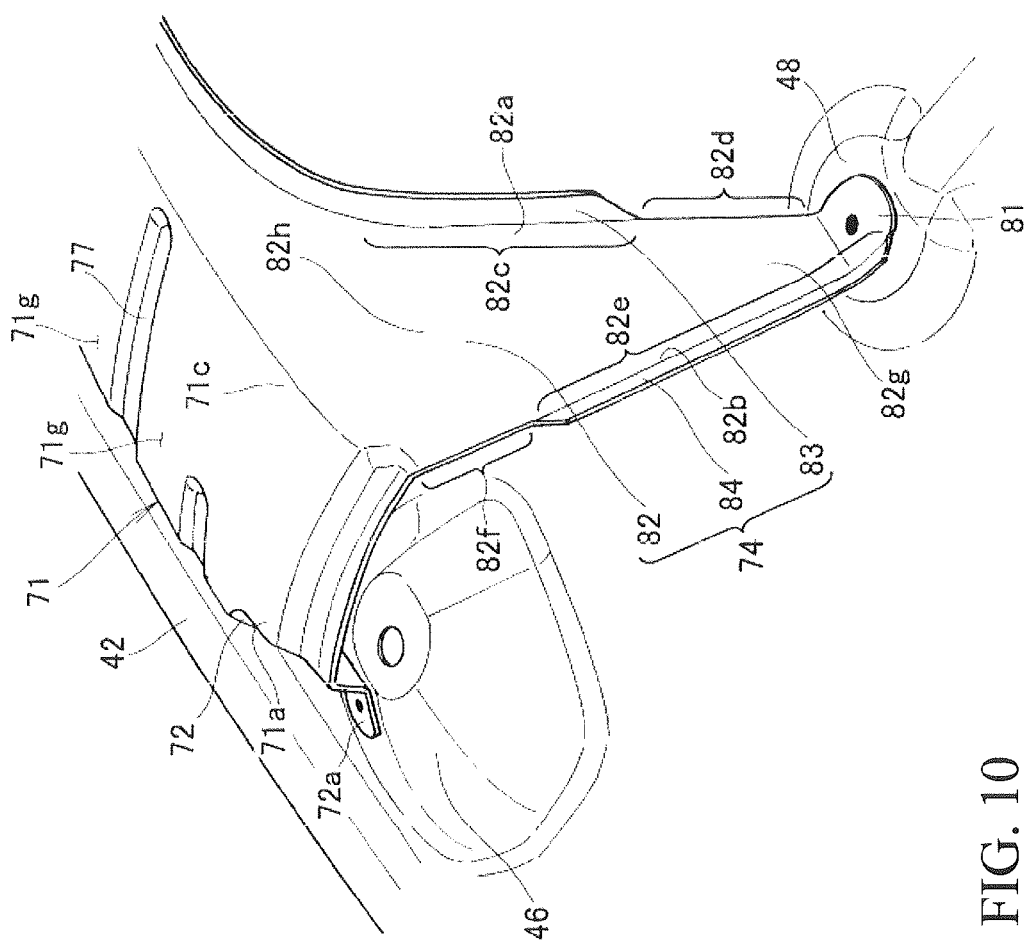
FIG. 10 is a portion of a view of FIG. 5 enlarged for magnification purposes.

As shown in FIG. 5, left and right rear leg units 74, 75 are provided in the upper left and right ends 71c, 71d of the reinforcement main body 71. As shown in FIG. 10, the left rear leg unit 74 extends on a downward slope from the upper left end 71c of the reinforcement main body 71 to the left rear support unit 48 (hood frame 42) to the rear of the vehicle, and a mounting unit 81 is provided in the left rear support unit 48.

By providing the mounting unit 81 for the left rear leg unit 74 in the left rear support unit 48 of the hood frame 42, the mounting unit 81 can be provided on the periphery (left side) of the striker bracket 34 (see FIG. 4). The left rear leg unit 74 may be formed so as to gradually assume a narrower shape from the reinforcement main body 71 to the left rear support unit 48. Although shown as narrowing in width, it is to be understood that the left rear leg unit 74 may narrow in thickness, or both width and thickness.

In other words, the left rear leg unit 74 has a left rear main body (rear leg main body) 82 extending from the reinforcement main body 71 to the left rear support unit 48, a left inner flange (inner flange) 83 extending out from the inner edge 82a of the left rear leg main body 82, and a left outer flange (outer flange) 84 extending out from the outer edge 82b of the left rear leg main body 82.

The left rear main body 82 may be substantially formed in an inverted triangle shape so as to assume a narrower shape from the reinforcement main body 71 to the left rear support unit 48. Because the left rear main body 82 has a narrow shape, the left rear leg unit 74 can be favorably deformed by an impact load imparted to the left rear leg main body 82 (i.e., left rear leg unit 74).

The left inner flange 83 is a reinforcing flange extending out inwardly towards the rear of the vehicle from the inner edge 82a of the left rear leg main body 82 from the inner portion 82c except in the vicinity of the mounting unit 81 (substantially the upper half). This left inner flange 83 is not provided on the inner edge 82a of the left rear leg main body 82 in substantially the lower half 82d (in the vicinity of the mounting unit 81).

The left outer flange 84 is a reinforcing flange extending outward towards the rear of the vehicle from the outer edge 82b of the left rear leg main body 82 from the outer portion 82e except in the vicinity of the reinforcement main body 71. The left outer flange 84 also extends outward and upward from the outer edge of the mounting unit 81. The left outer flange 84 is not provided on the outer edge 82b of the left rear leg main body 82 in the upper half 82f in the vicinity of the reinforcement main body 71.

Here, the left rear main body 82 is substantially formed in an inverted triangle shape so as to assume a narrower shape from the reinforcement main body 71 to the left rear support unit 48. Thus, the left rear leg main body 82 is formed so the lower leg unit 82g at the lower half 82d of the inner edge 82a has a smaller area and is relatively weak.

In addition, the left inner flange 83 is not substantially provided on the lower half 82d of the inner edge 82a (in the vicinity of the mounting unit 81) so as to reduce the strength in the vicinity of the mounting unit 81. This allows the lower leg unit 82g to be rapidly deformed by an impact load imparted to the left rear leg unit 74, and to advantageously absorb the impact load.

The left rear main body 82 is formed so that the upper leg unit 82h with an upper portion 82f on the outer edge 82b has a larger area and is stronger than the lower leg unit 82g. Also, because the left outer flange 84 is not provided in the upper portion 82f of the outer edge 82b, the strength is reduced in the vicinity of the reinforcement main body 71. Thus, the upper leg unit 82h can be rapidly deformed after the lower leg unit 82g has been rapidly deformed by an impact load imparted to the left rear leg unit 74, and the impact load can be continuously, effectively, and advantageously absorbed.

As shown in FIG. 5, the right rear leg unit 75 may be symmetrical to the left rear leg unit 74. It extends on a downward slope from the upper right end 71d of the reinforcement main body 71 to the right rear support unit 49 (hood frame 42) to the rear of the vehicle, and a mounting unit 86 is provided in the right rear support unit 49. Although shown as narrowing in width, it is to be understood that the right rear leg unit 75 may narrow in thickness, or both width and thickness.

By providing the mounting unit 86 for the right rear leg unit 75 in the right rear support unit 49 in the hood frame 42, the mounting unit 86 can be provided on the periphery (right side) of the striker bracket 34. The right rear leg unit 75 is formed so as to gradually assume a narrower shape from the reinforcement main body 71 to the right rear support unit 49.

In other words, the right rear leg unit 75 has a right rear main body (rear leg main body) 87 extending from the reinforcement main body 71 to the right rear support unit 49, a right inner flange (inner flange) 88 extending out from the inner edge 87a of the right rear leg main body 87, and a right outer flange (outer flange) 89 extending out from the outer edge 87b of the right rear leg main body 87.

The right rear main body 87 may be substantially formed in an inverted triangle shape so as to assume a narrower shape from the reinforcement main body 71 to the right rear support unit 49. Because the right rear main body 87 has a narrow shape, the right rear leg unit 75 can be favorably deformed by an impact load imparted to the right rear leg main body 87 (i.e., right rear leg unit 75).

The right inner flange 88 is a reinforcing flange extending out inwardly towards the rear of the vehicle from the inner edge 87a of the right rear leg main body 87 from the inner portion 87c except in the vicinity of the mounting unit 86 (substantially the upper half). This right inner flange 88 is not provided on the inner edge 87a of the right rear leg main body 87 in substantially the lower half 87d.

The right outer flange 89 is a reinforcing flange extending outward towards the rear of the vehicle from the outer edge 87b of the right rear leg main body 87 from the outer portion 87e except in the vicinity of the reinforcement main body 71. The right outer flange 89 also extends outward and upward from the outer edge of the mounting unit 86. The right outer flange 89 is not provided on the outer edge 87b of the right rear leg main body 87 in the portion 87f in the vicinity of the reinforcement main body 71.

Here, the right rear main body 87 is substantially formed in an inverted triangle shape so as to assume a narrower shape from the reinforcement main body 71 to the right rear support unit 49. Thus, the right rear leg main body 87 is formed so the lower leg unit 87g at the lower half 87d of the inner edge 87a has a smaller area and is relatively weak.

In addition, the right inner flange 88 is not substantially provided on the lower half 87d of the inner edge 87a (in the vicinity of the mounting unit 86) so as to reduce the strength in the vicinity of the mounting unit 86. This allows the lower leg unit 87g to be rapidly deformed by an impact load imparted to the right rear leg unit 75, and to advantageously absorb the impact load.

The right rear main body 87 is formed so that the upper leg unit 87h with an upper portion 87f on the outer edge 87b has a larger area and is stronger than the lower leg unit 87g. Also, because the right outer flange 89 is not provided in the upper portion 87f of the outer edge 87b, the strength is reduced in the vicinity of the reinforcement main body 71. Thus, the upper leg unit 87h can be rapidly deformed after the lower leg unit 87g has been rapidly deformed by an impact load imparted to the right rear leg unit 75, and the impact load can be continuously, effectively, and advantageously absorbed.

However, reinforcement 33 is provided as shown in FIG. 4 so that the mounting units 72a, 73a for the left and right front leg units 72, 73 are around the striker bracket 34 of the hood frame 42 (on the left and right sides in front). Also, reinforcement 33 is provided so that the mounting units 81, 86 for the left and right rear leg units 74, 75 are around the striker bracket 34 of the hood frame 42 (on the left and right sides). Thus, the mounting units 72a, 73a for the left and right front leg units 72, 73 and the mounting units 81, 86 for the left and right rear leg units 74, 75 can reinforce the area around the striker bracket 34. When the hood 32 is closed, the rod bottom unit 35a of the striker 35 contacts the hood locking device 15, and the load inputted to the striker 35 can be favorably dispersed to the striker bracket 34.

Also, as shown in FIG. 5 and FIG. 10, because a left inner flange 83 and a left outer flange 84 are provided in the left rear leg main body 82, the left rear leg main body 82 (left rear leg unit 74) is reinforced by the left inner flange 83 and the left outer flange 84. Because a right inner flange 88 and a right outer flange 89 are provided in the right rear leg main body 87, the right rear leg main body 87 (right rear leg unit 75) is reinforced by the right inner flange 88 and the right outer flange 89.

Thus, because the mounting units 81, 86 for the left and right rear leg units 74, 75 are provided around the striker bracket 34 of the hood frame 42 (to the left and right), the area around the striker bracket 34 can be reinforced. When the hood 32 is closed, the rod bottom unit 35a of the striker 35 contacts the hood locking device, and the load inputted to the striker 35 can be favorably dispersed to the periphery of the striker bracket 34.

Also, the mounting units 81, 86 for the left and right rear leg units 74, 75 may be provided on substantially the same line (line 90) as the striker 35 in a direction that is substantially parallel to the width direction of the vehicle. Thus, the portions of the hood frame 42 on substantially the same line (line 90) as the striker 35 in the width direction of the vehicle can be reinforced by the mounting units 81, 86. When the hood 32 is closed, the rod bottom unit 35a of striker 35 contacts the hood locking device 15, and the load inputted to the striker 35 can be favorably dispersed to the mounting units 81, 86.

In addition, as shown in FIG. 4, the left and right front leg support units 46, 47 in which the mounting units 72a, 73a of the left and right front leg units 72, 73 are provided bulge upward, and the left and right rear leg support units 48, 49 in which the mounting units 81, 86 of the left and right rear leg units 74, 74 are provided bulge upward. Thus, the strength of the left and right front leg support units 46, 47 and the left and right rear leg support units 48, 49 can be increased. When the hood 32 is closed, the rod bottom unit 35a of striker 35 contacts the hood locking device 15, and the load inputted to the striker 35 can be favorably dispersed to the left and right front leg support units 46, 47 and the left and right rear leg support units 48, 49.

Here, the reinforcement 33, as shown in FIG. 6, is provided on a downward slope along the hood skin 41 towards the front of the vehicle. By providing a reinforcement main body 71 along the hood skin 41, the hood skin 41 can be reinforced by the reinforcement main body 71.

Thus, for example, when hands are placed on the hood skin 41 from above in front of the vehicle, the light load inputted to the hood skin (the load applied by the hands) can be supported by the reinforcement 33. This can prevent the hood skin 41 from being deformed by the light load inputted to the hood skin 41.

Furthermore, because the reinforcement main body 71 is equipped with reinforcing beads 77 (see also FIG. 4), when, for example, hands are placed on the hood skin 41, the light load inputted to the hood skin 41 can be supported by the reinforcement 33. This can prevent the hood skin 41 from being deformed by the light load inputted to the hood skin 41.

Furthermore, as shown in FIG. 4, the left and right front leg reinforcing units 72b, 73b of the left and right front leg units 72, 73 extend in a substantially perpendicular direction. Thus, for example, when hands are placed on the hood skin 41 (see FIG. 6), the light load inputted to the hood skin 41 can be supported by the left and right front leg units 72, 73. This can prevent the hood skin 41 from being deformed by the light load inputted to the hood skin 41.

In addition, the left rear main body 82 (left rear leg unit 74) is reinforced by the left inner flange 83 and the left outer flange 84, and the right rear main body 87 (right rear leg unit 75) is reinforced by the right inner flange 88 and the right outer flange 89. Thus, for example, when hands are placed on the hood skin 41 (see FIG. 6), the light load inputted to the hood skin 41 (the load applied by the hands) can be supported by the left and right rear leg units 74, 75 (i.e., the reinforcement 33). This can prevent the hood skin 41 from being deformed by the light load inputted to the hood skin 41.

Also, the left and right front leg support units 46, 47 in which the mounting units 72a, 73a of the left and right front leg units 72, 73 are provided bulge upward, and the left and right rear leg support units 48, 49 in which the mounting units 81, 86 of the left and right rear leg units 74, 74 are provided bulge upward. Thus, the strength of the left and right front leg support units 46, 47 and the left and right rear leg support units 48, 49 can be increased.

Thus, for example, when hands are placed on the hood skin 41, the light load inputted to the hood skin 41 (the load applied by the hands) can be supported by the left and right front leg support units 46, 47 and the left and right rear leg support units 48, 49. This can prevent the hood skin 41 from being deformed by the light load inputted to the hood skin 41.

In the front body structure for a vehicle 10 explained above, the frame reinforcing unit 44 for reinforcing the frame hood 42 is provided in front of the striker bracket 34 with respect to the vehicle as shown in FIG. 2. Also, reinforcement 33 is arranged between the frame reinforcing unit 44 and the hood skin 41. In other words, the frame reinforcing unit 44 and the reinforcement 33 are provided in a portion in front of the striker bracket 34.

Here, the portion in front of the striker bracket 34 with respect to the vehicle is the position at which the impact load is inputted from above in front of the vehicle. Because the strengths of the frame reinforcing unit 44 and the reinforcement 33 are adjusted individually, the impact load can be advantageously absorbed.

Figure 11A:
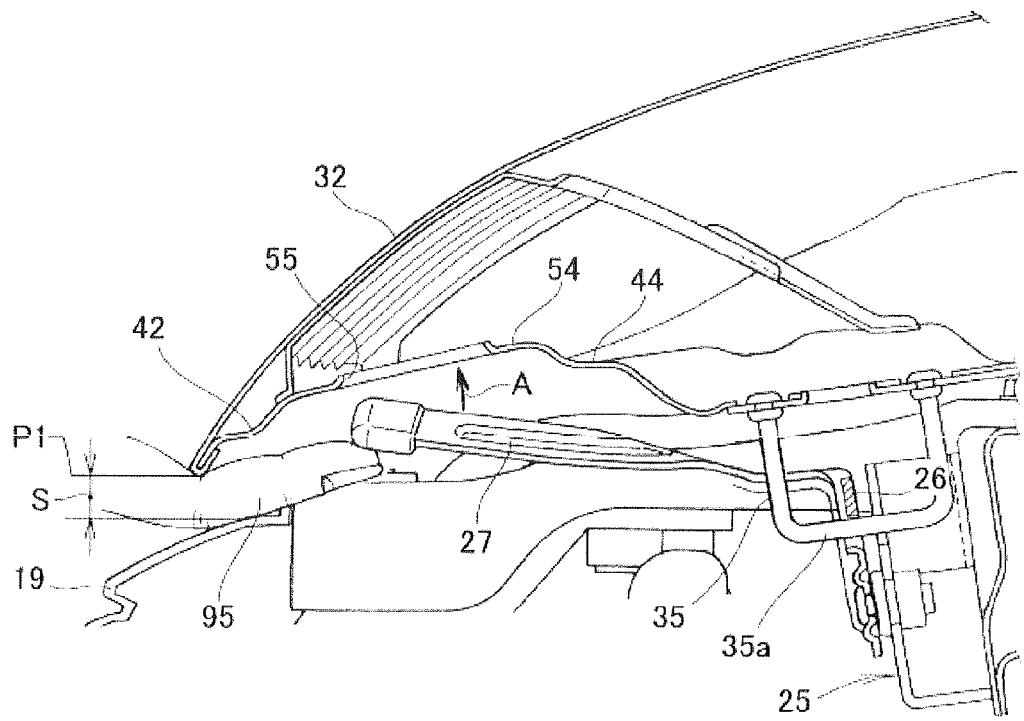
FIG. 11A is a cross-sectional view used to explain the operation of the unlocking lever in one embodiment of the present disclosure.

The following is an explanation of the process for releasing the hood 32 with reference to FIG. 11. As shown in FIG. 11A, when the striker 35 engaged by the lock unit 25 is released, the hood 32 is raised slightly but the rod bottom unit 35a of the striker 35 is engaged by the locking hook 26. In this state, the hood 32 is positioned at P1, and a space S is created between the bumper grille 19 and the hood 32.

A finger 95 is inserted into the space S between the bumper grille 19 and the hood 32, and the inserted finger 95 contacts the unlocking lever 27. The finger 95 making contact with the unlocking lever 27 then lifts the unlocking lever 27 upward as shown in arrow A.

Here, the frame reinforcing unit 44 is provided above the unlocking lever 27, the frame reinforcing unit 44 bulges upward, and the low strength portion 55 in the top unit 54 is formed in the shape of an opening. Because the frame reinforcing unit 44 bulges upward, the top unit 54 of the frame reinforcing unit 44 can be separated sufficiently above the unlocking lever 27. Thus, a larger vertical stroke for the unlocking lever 27 can be ensured. In addition, because the low strength portion 55 is an open portion, the vertical stroke (amount of movement) by the unlocking lever 27 can be more reliably ensured.

Thus, when the unlocking lever 27 has been lifted upward using a finger 95 in contact with the unlocking lever 27, there is no danger of interference between the unlocking lever 27 and the hood frame 42. Therefore, the unlocking lever 27 can be reliably lifted to the unlocked position P2, and the unlocking lever 27 can be operated favorably.

Figure 11B:
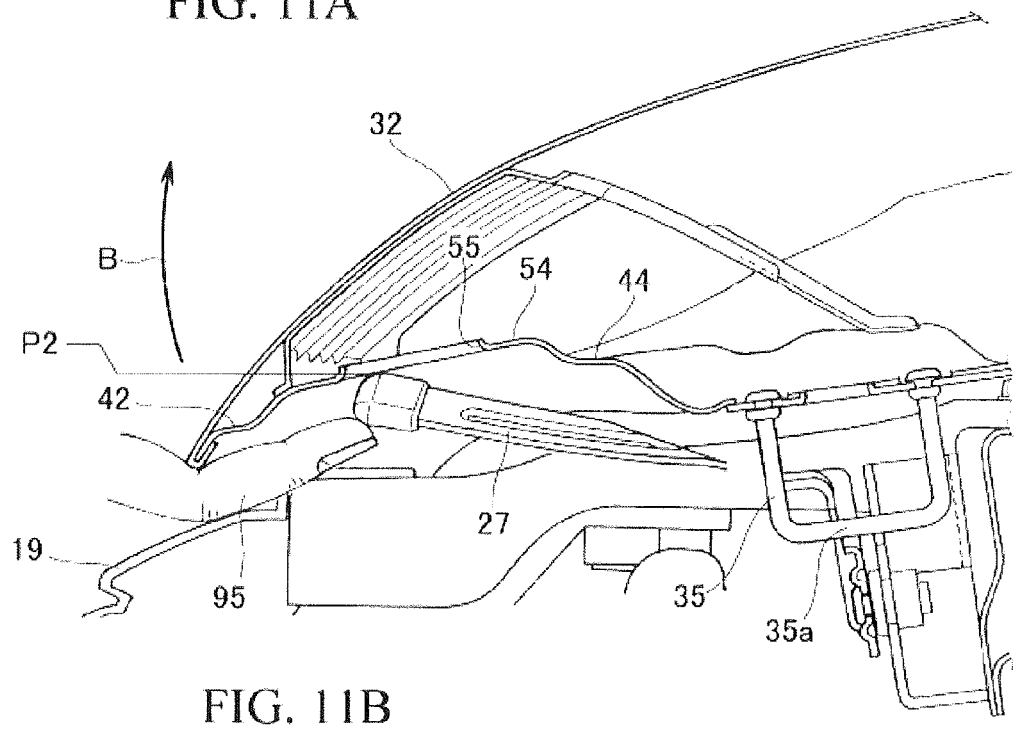
FIG. 11B is a cross-sectional view showing an engaged striker unlocked by the unlocking lever in one embodiment of the present disclosure.

As shown in FIG. 11B, because the unlocking lever 27 moves vertically, the locking hook 26 can be separated from the rod bottom unit 35a of the striker 35 (see FIG. 11B). When the locking hook 26 is separated from the striker 35, the striker 35 locked by the locking hook 26 is released. When the locked striker 25 has been released by the locking hook 26 and the hood 32 lifted, the hood 32 can be opened as shown by arrow B.

The following is an explanation with reference to FIG. 12 through FIG. 15 of an example in which an impact load is inputted to the hood 32 from above at the front of the vehicle. FIGS. 13B, 14B, and 15B are graphs showing the relationship between the acceleration when displacement occurs in the direction of arrow C by an input load inputted to the load input portion 41b to the hood 32 ("displacement acceleration") and the time during which displacement at the load input portion 41b occurs ("displacement time"). In these graphs, the vertical axis indicates the displacement acceleration, and the horizontal axis denotes the displacement time.

Figure 12:
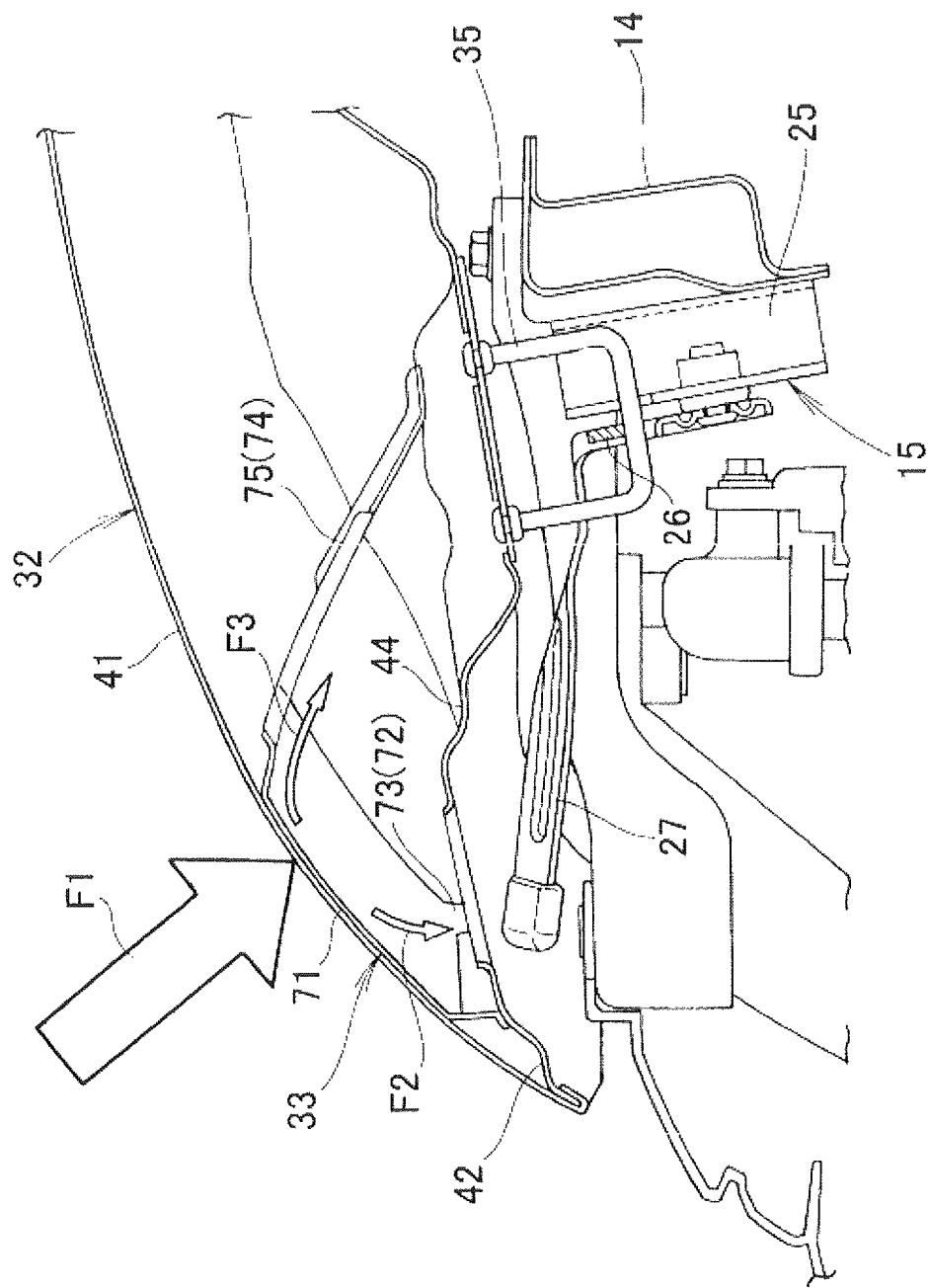
FIG. 12 is a cross-sectional view used to explain an example of an impact load inputted from above at the front of a vehicle on the hood in the front body structure in one embodiment of the present disclosure.

As shown in FIG. 12, the impact load F1 is inputted as shown by the arrow to the hood 32 (load input portion 41b of the hood skin 41) from above at the front of the vehicle. The position at which the input load F1 is inputted is faced (opposed) by the reinforcement main body 71 of the reinforcement 33.

Here, the reinforcement main body 71 is provided on a downward slope along the hood skin 41 towards the front of the vehicle. Thus, the reinforcement main body 71 is substantially perpendicular to the impact load F1. This allows the impact force F1 to be favorably dispersed by the reinforcement main body 71.

In addition, the reinforcement main body 71 may be equipped with reinforcing beads 77 (see FIG. 4), and these beads 77 extend in the length direction of the vehicle. Thus, the impact load F1 can be imparted favorably from the reinforcement main body 71 to the left and right rear leg units 74, 75. This helps the left and right leg units 74, 75 to be favorably deformed by the impact load F1, and the impact load F1 to be advantageously absorbed.

Because the impact load F1 is inputted to the hood 32 from above at the front of the vehicle, the impact load F1 is imparted to the reinforcement 33 via the hood skin 41. The load imparted to the reinforcement 33 is imparted via the reinforcement main body 71 to the left and right front leg units 72, 73 as load F2, and to the left and right rear leg units 74, 75 as load F3.

Figures 13A, 13B:
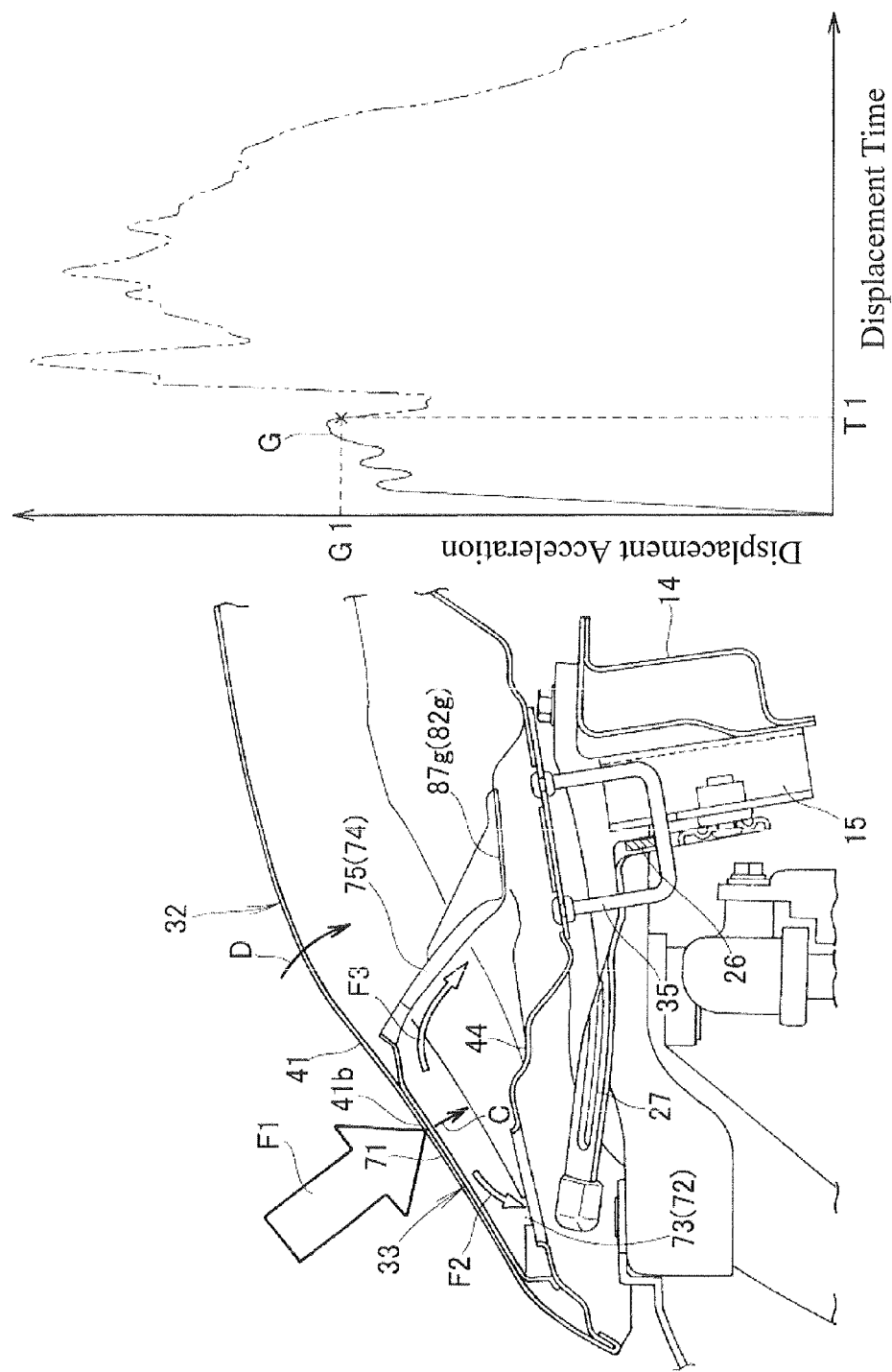
FIG. 13A is a cross-sectional view used to explain an example in which the front body structure in one embodiment of the present disclosure has begun to be deformed by an impact load.
FIG. 13B is a graph showing the relationship between displacement acceleration and displacement time in the front body structure in one embodiment of the present disclosure.

As shown in FIG. 13A, the relative strength of the left and right front leg units 72, 73 is increased by the provision of left and right front leg reinforcing units 72b, 73b (see FIG. 4). Thus, the load F2 imparted to the left and right front leg units 72, 73 can be supported by the left and right front leg units 72, 73.

Meanwhile, the left and right rear leg units 74, 75 have lower leg units 82g, 87g that are formed so as to be relatively weak. Thus, the lower leg units 82g, 87g of the left and right rear leg units 74, 75 are deformed by the load F3 imparted to the left and right leg units 74, 75. Because the lower leg units 82g, 87g are deformed, the load input portion 41b of the hood 32 is deformed in the direction of arrow C.

Here, the relative strength of the left and right front leg units 72, 73 is increased by the provision of left and right front leg reinforcing units 72b, 73b. Thus, when the lower leg units 82g, 87g are deformed, the reinforcement main body 71 swings smoothly in the direction of arrow D towards the hood frame 42 with the left and right front leg units 72, 73 serving as pivots or fulcrums. In this way, the load F3 can be advantageously absorbed.

As shown in graph G in FIG. 13B, by ensuring that the deformation time T1 is longer when the load input portion 41b of the hood 32 begins to become deformed, the deformation acceleration G1 can be reduced. By reducing the deformation acceleration G1 in this manner, a portion of the load F3 (see FIG. 13A) can be advantageously absorbed.

Figure 14B:
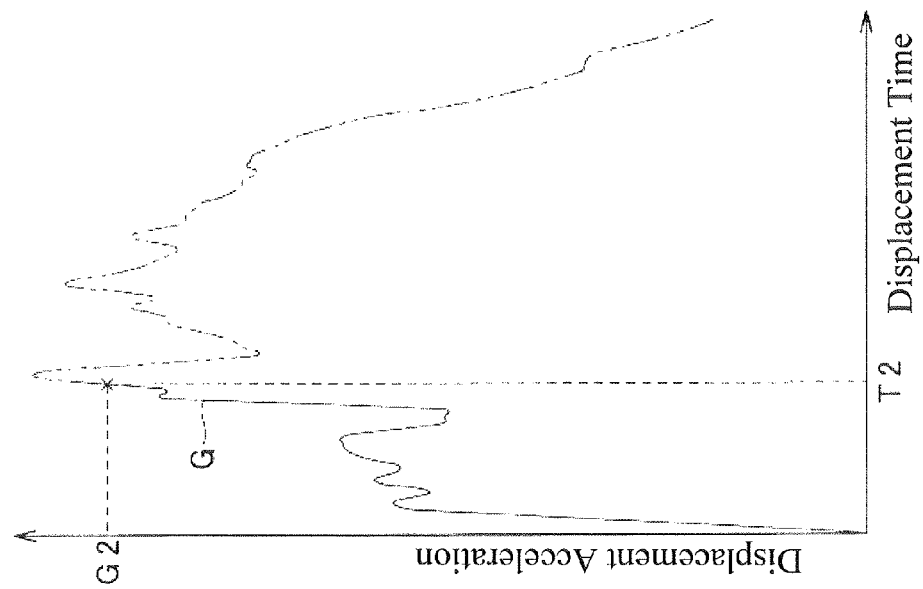
FIG. 14B is a graph showing the relationship between displacement acceleration and displacement time in the front body structure in one embodiment of the present disclosure.
Figure 14A:
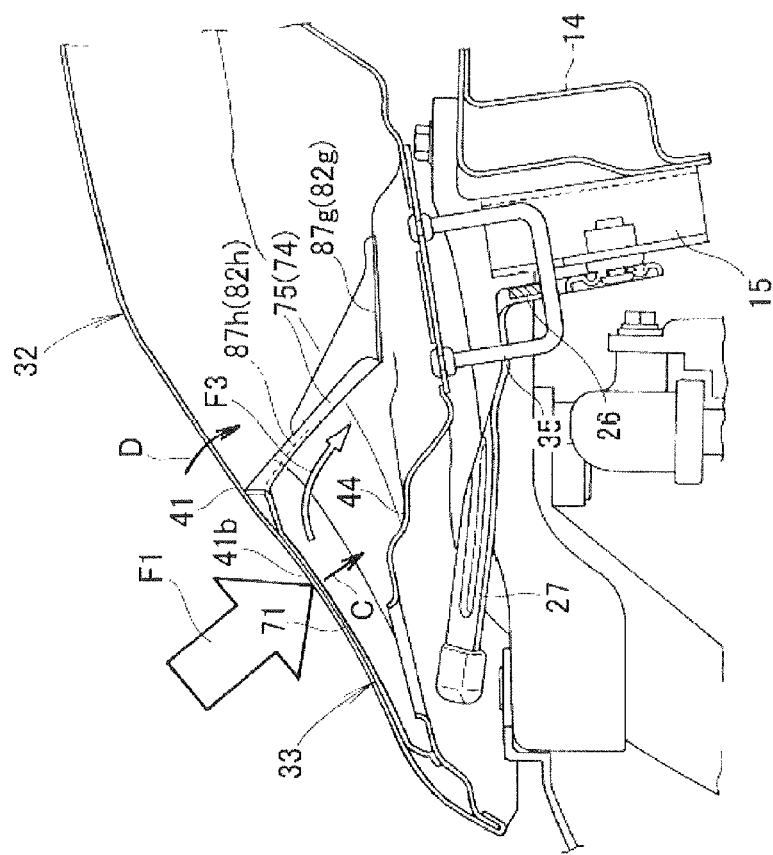
FIG. 14A is a cross-sectional view used to explain an example of the front body structure in one embodiment of the present disclosure being deformed by an impact load.

As shown in FIG. 14A, the lower leg units 82g, 87g of the left and right rear leg units 74, 75 are continuously deformed by the load F3 imparted to the left and right rear leg units 74, 75. Here, the strength of the upper leg unit 82h of the left rear leg main body 82 is greater than the lower leg unit 82g (see also FIG. 10). Also, the strength of the upper leg unit 87h of the right rear leg main body 87 is greater than the lower leg unit 87g (see also FIG. 5).

Thus, after the lower leg units 82g, 87g of the left and right rear leg units 74, 75 have been deformed, the upper leg units 82h, 87h of the left and right rear leg units 74, 75 begin to become deformed. Because of the deformation of the lower leg units 82g, 87g and the deformation of the upper leg units 82h, 87h, the load input portion 41b of the hood 32 is continuously displaced in the direction of arrow C.

As shown in graph G in FIG. 14B, by ensuring that the deformation time T2 is longer when the load input portion 41b of the hood 32 begins to become deformed, the deformation acceleration G2 can be reduced. By reducing the deformation acceleration G2 in this manner, a portion of the load F3 (see FIG. 14A) can be advantageously absorbed.

Figure 15B:
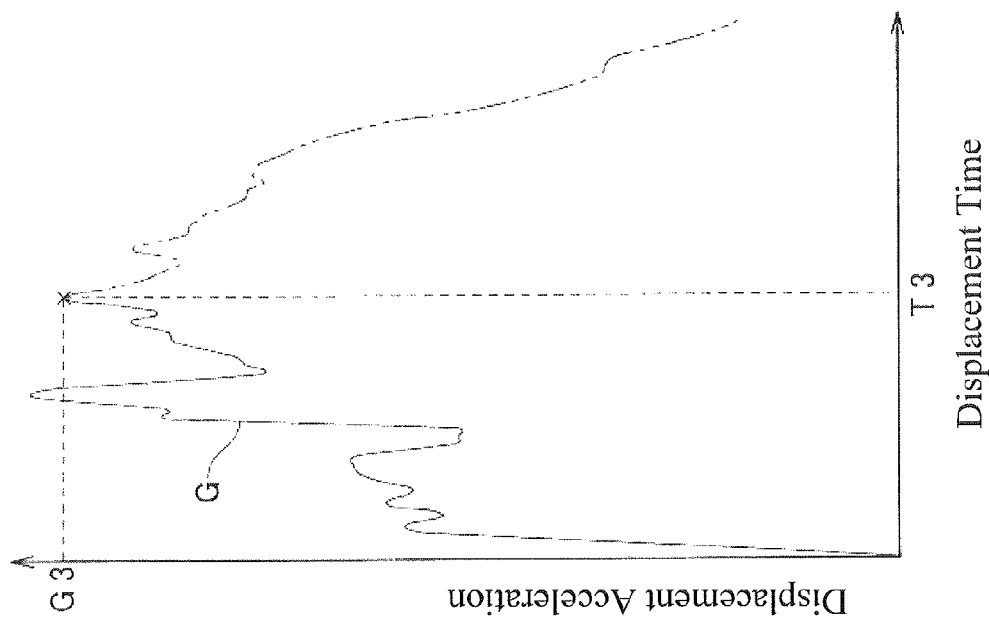
FIG. 15B is a graph showing the relationship between displacement acceleration and displacement time in the front body structure in one embodiment of the present disclosure.
Figure 15A:
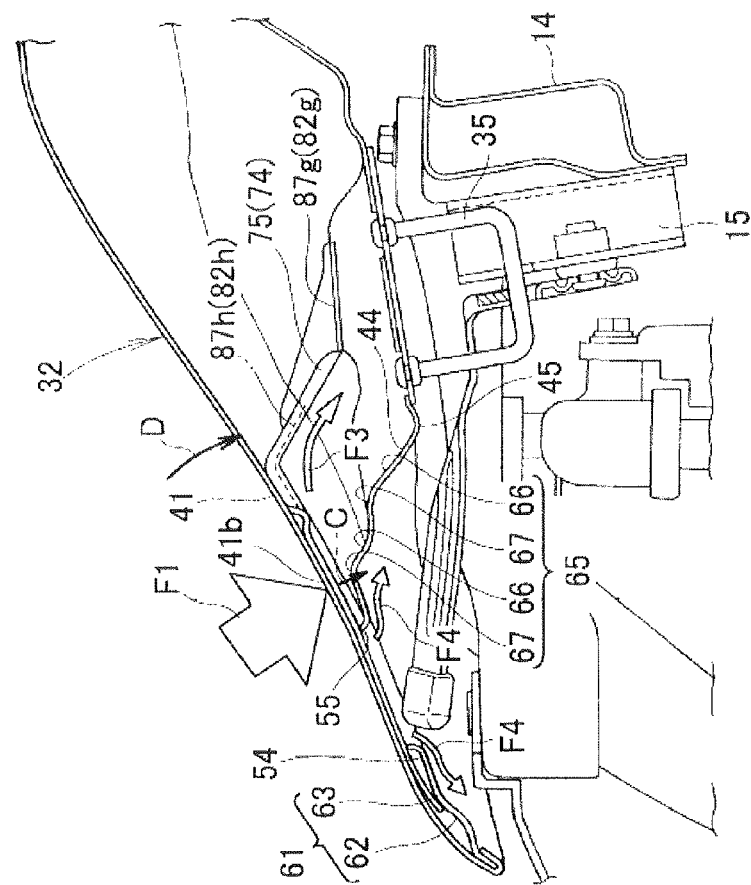
FIG. 15A is a cross-sectional view used to explain an example of the front body structure in one embodiment of the present disclosure being further deformed by an impact load.

As shown in FIG. 15A, because the upper leg units 82h, 87h of the left and right rear leg units 74, 75 are deformed, the reinforcement main body 71 of the reinforcement 33 comes into contact with the top unit 54 of the frame reinforcing unit 44.

Here, the top unit 54 is inclined towards the front of the vehicle at angle of inclination θ (see FIG. 6). Because the top unit 54 is inclined towards the front of the vehicle, the impact load F1 can be received favorably by the top unit 54, and imparted to the frame reinforcing unit 44 as load F4.

Also, a low strength portion 55 is provided in the top unit 54, and the low strength portion 55 is an open portion. Because a low strength portion 55 is provided in the top unit 54, the top unit 54 can be deformed favorably by the load F4. This allows the load F4 to be advantageously absorbed by the frame reinforcing unit 44.

Also, both the front vehicle portion 61 and the rear vehicle portion 65 of the low strength portion 55 are substantially formed in the shape of a bowl. Because the front vehicle portion 61 and the rear vehicle portion 65 are substantially formed in the shape of a bowl, a front tier unit 63 is formed in the front vehicle portion 61, and a rear tier unit 67 is formed in the rear vehicle portion 65. Also, increasing the number of tiers only in the rear tier unit 67 can reliably increase the strength of the rear vehicle portion 65 only.

Thus, the front tier unit 63 (front vehicle portion 61) is ensured of enough strength to be favorably deformed by the impact load inputted from above at the front of the vehicle. This allows the front vehicle portion 61 to be favorably deformed by the impact load inputted from above at the front of the vehicle. Because the front tier unit 63 is favorably deformed by the load F4, the load F4 can be advantageously absorbed.

Also, a peripheral edge unit 45 is provided on the periphery of the frame reinforcing unit 44. Because the peripheral edge unit 45 is not provided in the front region H towards the front of the vehicle, the peripheral edge unit 45 is substantially C-shaped (see FIG. 7). Because the peripheral edge unit 45 is not provided in the front region H towards the front of the vehicle, the strength of the frame reinforcing unit 44 can be reduced. This allows the frame reinforcing unit 44 to be favorably deformed by the load F4 inputted from above at the front of the vehicle, and the load F4 to be advantageously absorbed. Because of the deformation of the upper leg units 82h, 87h and the deformation of the frame reinforcing unit 44, the load input portion 41b of the hood 32 is displaced greatly in the direction of arrow C.

As shown in graph G in FIG. 15B, by ensuring that the deformation time T3 is longer when the load input portion 41b of the hood 32 begins to become deformed, the deformation acceleration G3 can be reduced. By reducing the deformation acceleration G3 in this manner, load F3 and load F4 can be advantageously absorbed as shown in FIG. 15A.

The front body structure for a vehicle in the present disclosure is not restricted to the example described above. Appropriate changes and improvements are possible. For example, in the example described above, the front body structure for a vehicle 10 was applied to an RV. However, the present disclosure is not restricted to this example and can be applied to other types of vehicles. Although described herein with respect to vehicles having internal combustion engines, it is to be understood that the present disclosure is meant to encompass any type of vehicle including, but not limited to, electric, hybrid, fuel cell, and compressed natural gas vehicles.

Also, the shapes and configurations of the various components are not restricted to those in the example described above. Appropriate changes are possible. These components include, but are not limited to, the front body structure for the vehicle 10, the bulkhead 14, the hood locking device 15, the lock unit 25, the unlocking lever 27, the hood 32, the reinforcement 33, the striker bracket 34, the striker 35, the hood skin 41, the hood frame 42, the frame reinforcing unit 44, the peripheral edge unit 45, the left and right front leg support units 46, 47, the left and right rear leg support units 48, 49, the top unit 54, the low strength portion 55, top reinforcing unit 56, front vehicle portion 61, front tier unit 63, rear vehicle portion 65, rear tier unit 67, reinforcement main body 71, left and right front leg unit 72, 73, left and right front leg reinforcing unit 72b, 73b, left and right rear leg unit 74, 75, bead 77, left and right rear leg main body 82, 87, left and right inner flange 83, 88, and left and right outer flange 84, 89.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described to best illustrate the principles of the invention and various embodiments as are suited to the particular use contemplated. The scope of this disclosure is, of course, not limited to the examples or embodiments set forth herein, but can be employed in any number of applications and equivalent devices by those of ordinary skill in the art. Rather it is hereby intended the scope of this disclosure be defined by the claims appended hereto.

What is claimed is:

1. A front body structure for a vehicle comprising:
    an openable and closable hood including a hood skin forming an exterior surface of the front body structure and a hood frame provided on an interior surface of the hood skin, the hood frame comprises a substantially C-shaped peripheral edge unit;
    a bulkhead provided below the hood;
    a hood locking device provided in the bulkhead;
    a striker bracket provided on the hood frame;
    a striker extending from the striker bracket for engaging the hood locking device;
    a frame reinforcing unit provided in front of the striker bracket for reinforcing the hood frame, wherein the peripheral edge unit bulges away from the hood skin on the periphery of the frame reinforcing unit in portions other than the front side of the vehicle; and
    a reinforcement secured to the hood frame and positioned between the frame reinforcing unit and at least a portion of the hood skin.

2. The front body structure for a vehicle according to claim 1, wherein the hood locking device comprises a lock unit provided in the bulkhead, and an unlocking lever able to unlock the lock unit and the striker when the striker is in a locked state by extending the unlocking lever from the lock unit towards the frame reinforcing unit, and wherein the frame reinforcing unit bulges from the hood frame towards the hood skin and comprises a top unit that is inclined towards the front of the vehicle and arranged above the unlocking lever when the striker is in a locked state, a low strength portion provided on the top unit and having less strength than the top unit surrounding the low strength portion, and a base provided around the top unit for reinforcing the top unit.

3. The front body structure for a vehicle according to claim 2, wherein the low strength portion defines an opening in the top unit.

4. The front body structure for a vehicle according to claim 2, wherein the base comprises a front vehicle portion positioned in front of the low strength portion relative to the vehicle, and a rear vehicle portion positioned to the rear of the low strength portion relative to the vehicle, wherein the front vehicle portion and the rear vehicle portion are each substantially formed in a bowl shape, and wherein the strength of the rear vehicle portion is greater than the strength of the front vehicle portion.

5. The front body structure for a vehicle according to claim 4, wherein a front tier unit is formed in the front vehicle portion and a rear tier unit is formed in the rear vehicle portion, and Wherein the number of tiers in the rear tier unit is greater than the number of tiers in the front tier unit.

6. The front body structure for a vehicle according to claim 1, wherein the reinforcement includes a front leg unit and a rear leg unit extending therefrom, the front and rear leg units each including a mounting unit thereon, and wherein the hood frame includes a front leg support unit bulging toward the hood skin and secured to the front leg mounting unit, and a rear leg support unit bulging toward the hood skin and secured to the rear leg mounting unit.

7. The front body structure for a vehicle according to claim 1, wherein the reinforcement comprises a main body provided on a downward slope along the hood skin towards the front of the vehicle, a pair of front leg units extending from the main body, and a pair of rear leg units extending from the main body on a downward slope towards the rear of the vehicle, and Wherein a mounting unit for each front leg unit and a mounting unit for each rear leg unit is positioned on the hood frame to substantially surround the striker bracket.

8. The front body structure for a vehicle according to claim 7, wherein the main body comprises at least one reinforcing bead extending in the length direction of the vehicle.

9. The front body structure for a vehicle according to claim 7, wherein each front leg unit is at least partially indented towards the main body to form a front leg reinforcing unit, and wherein the front leg reinforcing unit extends in a substantially perpendicular direction to the main body.

10. The front body structure for a vehicle according to claim 7, wherein each rear leg unit narrows in shape as it extends from the main body towards the hood frame.

11. The front body structure for a vehicle according to claim 7, wherein each rear leg unit has a rear leg main body assuming a narrower shape as it extends from the main body towards the hood frame, an inner flange for reinforcement extending out from an inner portion of an inner edge of the rear leg main body except in the vicinity of the mounting unit, and an outer flange for reinforcement extending out from an outer portion of an outer edge of the rear leg main body except in the vicinity of the main body.

12. The front body structure for a vehicle according to claim 7, wherein the mounting unit of each rear leg and the striker are aligned substantially parallel to the width direction of the vehicle.

13. A vehicle hood comprising:
a frame hingedly securable to a vehicle body structure and including a first side and a second side;
a skin covering the first side of the frame;
a striker bracket secured to the frame and including a striker extending from the second side of the frame for engaging a latching mechanism on the vehicle body structure; and
a reinforcement secured to the frame and positioned adjacent to the skin and between at least a portion of the skin and the striker bracket, the reinforcement includes a first leg extending therefrom to form a pivot with the frame, and a second leg extending therefrom to engage the frame, the second leg configured to deform in response to an impact applied to the skin to rotate the reinforcement toward the frame.

14. The vehicle hood of claim 13, wherein the second leg narrows as it extends from the reinforcement to the frame, and includes a first point positioned adjacent the frame that is configured to deform in response to the impact applied to the skin, and a second point positioned adjacent the reinforcement that is configured to deform after deformation of the first point.

15. The vehicle hood of claim 13, wherein the frame includes a front end, a reinforcing unit is positioned on the frame between the front end and the striker bracket, the reinforcing unit extends from the first side of the frame toward the skin, the frame includes a peripheral edge unit positioned along the periphery of a portion of the reinforcing unit, and the peripheral edge unit bulges away from the skin.

16. A vehicle hood comprising:
a frame hingedly securable to a vehicle body structure and including a first side and a second side;
a skin covering the first side;
a striker bracket secured to the frame and including a striker extending from the second side of the frame for engaging a locking device on the vehicle body structure, the locking device including an unlocking lever; and
a reinforcing unit extending from the first side of the frame toward the skin and defining a cavity on the second side of the frame, the cavity positioned to receive at least a portion of the unlocking lever during disengagement of the striker from the locking device, the reinforcing unit includes a base with a first wall and a second wall, the second wall is positioned on the first side of the frame between the first wall and the striker bracket, and the second wall is stronger than the first wall.

17. The vehicle hood of claim 16, wherein the reinforcing unit is provided with an opening to allow at least a portion of the lever to extend therethrough during disengagement of the striker from the locking device.

18. The vehicle hood of claim 16, wherein the reinforcing unit is positioned between the front of the vehicle hood and the striker bracket, the first wall includes at least one tier, and the second wall includes at least one tier more than the first wall.

19. The vehicle hood of claim 16, wherein the frame includes a front end, the reinforcing unit is positioned on the frame between the front end and the striker bracket, the frame includes a peripheral edge unit positioned along the periphery of a portion of the reinforcing unit, and the peripheral edge unit bulges away from the skin.

20. The vehicle hood of claim 16, further comprising a reinforcement secured to the frame and positioned adjacent to the skin and between at least a portion of the skin and the striker bracket, the reinforcement includes a first kg extending therefrom to form a pivot with the frame, and a second leg extending therefrom to engage the frame, the second leg configured to deform in response to an impact applied to the skin to rotate the reinforcement toward the frame.

* * * * *